(12) United States Patent
Martini et al.

(10) Patent No.: US 9,004,607 B1
(45) Date of Patent: Apr. 14, 2015

(54) LAWN AND GARDEN CART WITH WIDE-RANGE PIVOTABLE CONTAINER

(71) Applicant: Ohio Steel Industries, Inc., Columbus, OH (US)

(72) Inventors: Thomas P. Martini, Blacklick, OH (US); Andrew Pickhard, West Mansfield, OH (US); Michael Newman, Pataskala, OH (US)

(73) Assignee: Ohio Steel Industries, Inc., Columbus, OH (US)

( * ) Notice: Subject to any disclaimer, the term of this patent is extended or adjusted under 35 U.S.C. 154(b) by 0 days.

(21) Appl. No.: 14/068,408

(22) Filed: Oct. 31, 2013

Related U.S. Application Data

(60) Continuation-in-part of application No. 13/953,455, filed on Jul. 29, 2013, which is a division of application No. 12/875,032, filed on Sep. 2, 2010, now Pat. No. 8,496,298.

(60) Provisional application No. 61/239,147, filed on Sep. 2, 2009.

(51) Int. Cl.
*B60P 1/12* (2006.01)
*B60P 1/04* (2006.01)

(52) U.S. Cl.
CPC ........................ *B60P 1/04* (2013.01)

(58) Field of Classification Search
CPC ........................................................ B60P 1/04
USPC ...... 298/5, 10, 17 T, 17 SG, 38; 280/493, 494
See application file for complete search history.

(56) References Cited

U.S. PATENT DOCUMENTS

| | | | |
|---|---|---|---|
| 328,981 | A | 10/1885 | Sturgis |
| 3,501,169 | A | 3/1970 | Nutt, Jr. |
| 3,936,070 | A | 2/1976 | Owings |
| D249,138 | S | 8/1978 | Butler |
| 4,126,324 | A | 11/1978 | Browning |
| 4,417,765 | A | 11/1983 | Wirsbinski |
| D286,992 | S | 12/1986 | Doering |
| 4,789,171 | A | 12/1988 | Porter |
| 5,318,315 | A | 6/1994 | White et al. |
| 5,395,163 | A | 3/1995 | Mandell et al. |

(Continued)

OTHER PUBLICATIONS

Brochure, "Polar Trailer" available from CLAM Corporation, Inc. of Medina, MN; one page.

(Continued)

*Primary Examiner* — Stephen Gordon
(74) *Attorney, Agent, or Firm* — James R. Eley; Eley Law Firm Co, LPA

(57) ABSTRACT

A towable cart including an axle, at least one bearing rotatably coupled to the axle, a frame configured for selectable attachment to the bearing, and a container attached to the frame. A tow bar has a first and a second end, and is coupled to the axle at the first end of the tow bar. A first end of a tip structure is pivotally coupled to the container and a second end of the tip structure is fixedly attached to the bearing. An arm is attached to the container and is selectably coupled to the tow bar. The container is in a loading condition when the arm is coupled to the tow bar and is in an unloading condition when the arm is not coupled to the tow bar. The container is movable between the loading condition and the unloading condition over a pivoting range greater than ninety degrees.

19 Claims, 31 Drawing Sheets

(56) References Cited

U.S. PATENT DOCUMENTS

| | | |
|---|---|---|
| 5,544,944 A | 8/1996 | Keech |
| 5,915,706 A | 6/1999 | Mosley |
| 6,213,482 B1 | 4/2001 | Yemini |
| 6,290,301 B1 | 9/2001 | Bockman |
| 6,755,478 B2 | 6/2004 | Messinger-Rapport |
| 7,134,681 B1 | 11/2006 | Jones |
| 7,392,992 B2 | 7/2008 | Stone et al. |
| 7,665,768 B2 | 2/2010 | Duval |
| 8,496,298 B2 * | 7/2013 | Martini et al. .................... 298/5 |
| 2002/0054803 A1 | 5/2002 | Schmidt et al. |
| 2007/0164526 A1 | 7/2007 | Martini et al. |

OTHER PUBLICATIONS

Cover Page, Owner's Manual, Model No. 45-0464 "Poly Dump Cart" available from Agri-Fab of Sullivan, IL.

Brochure, "Gorilla Carts" available from Tricam Industries of Eden Prairie, MN; one page.

Manual, Gorilla Carts, Heavy Duty Garden Dump Cart Model #GOR866D, available from Tricam Industries of Eden Prairie, MN.

Owner's Manual, Duty Cart Mfg. No. 085, available from Simplicity Manufacturing Company, Inc. of Milwaukee, WI.

* cited by examiner

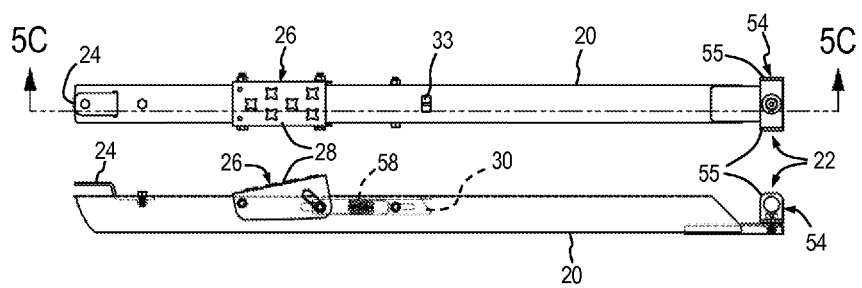
*Fig. 5A*
*Fig. 5B*
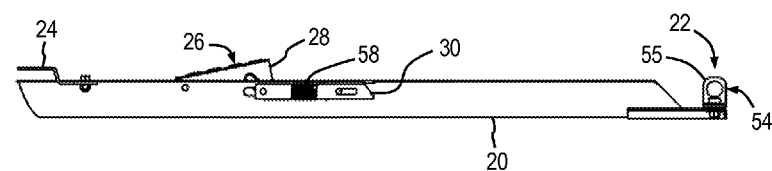
*Fig. 5C*
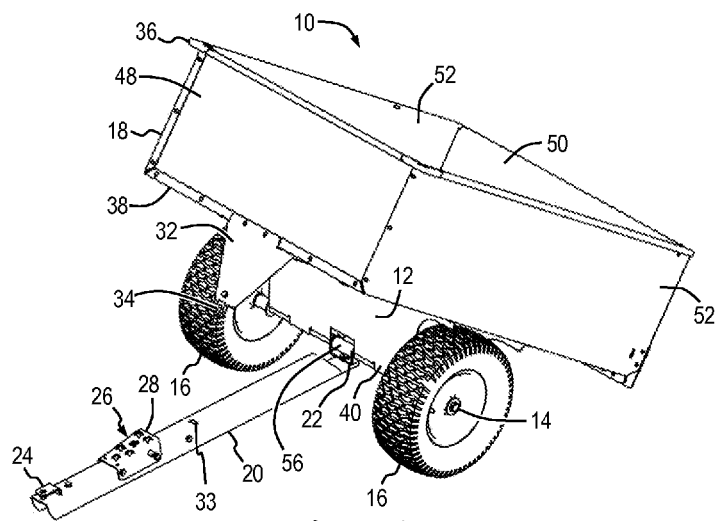
*Fig. 6*

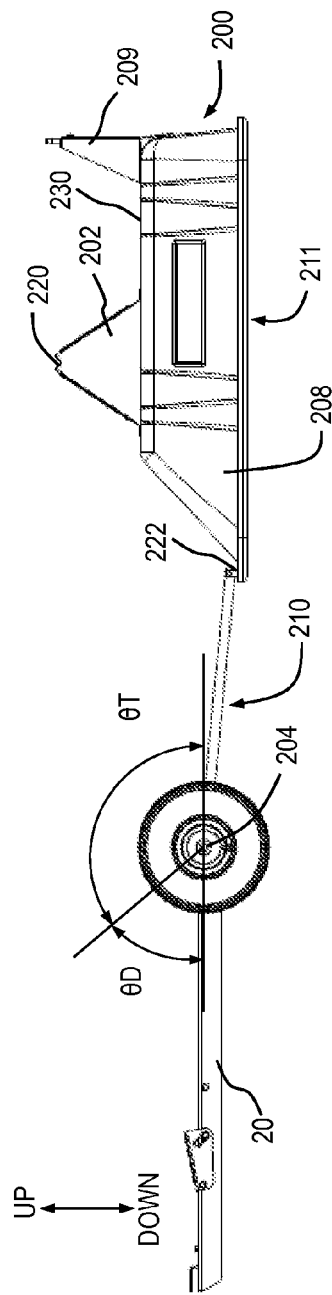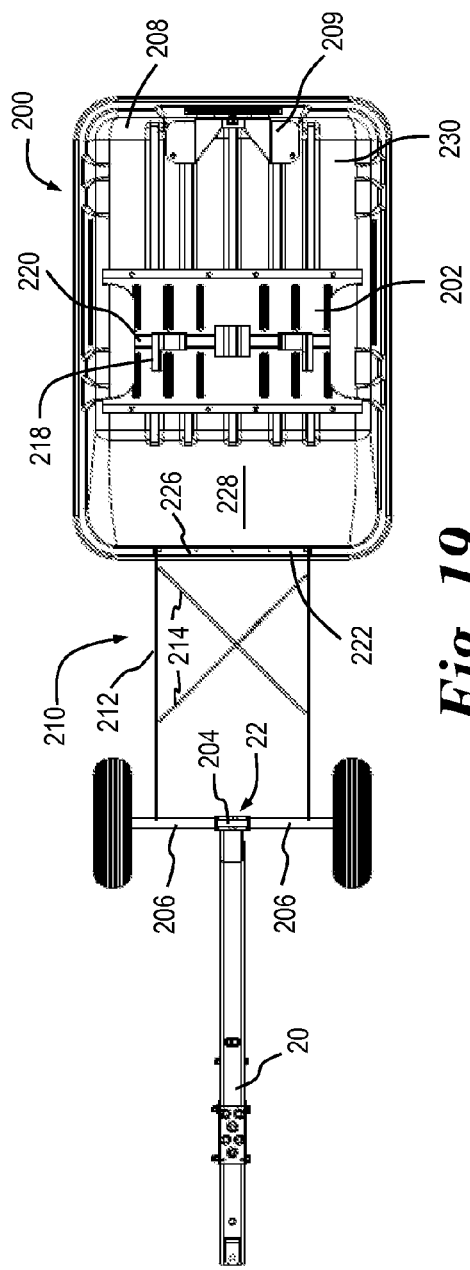

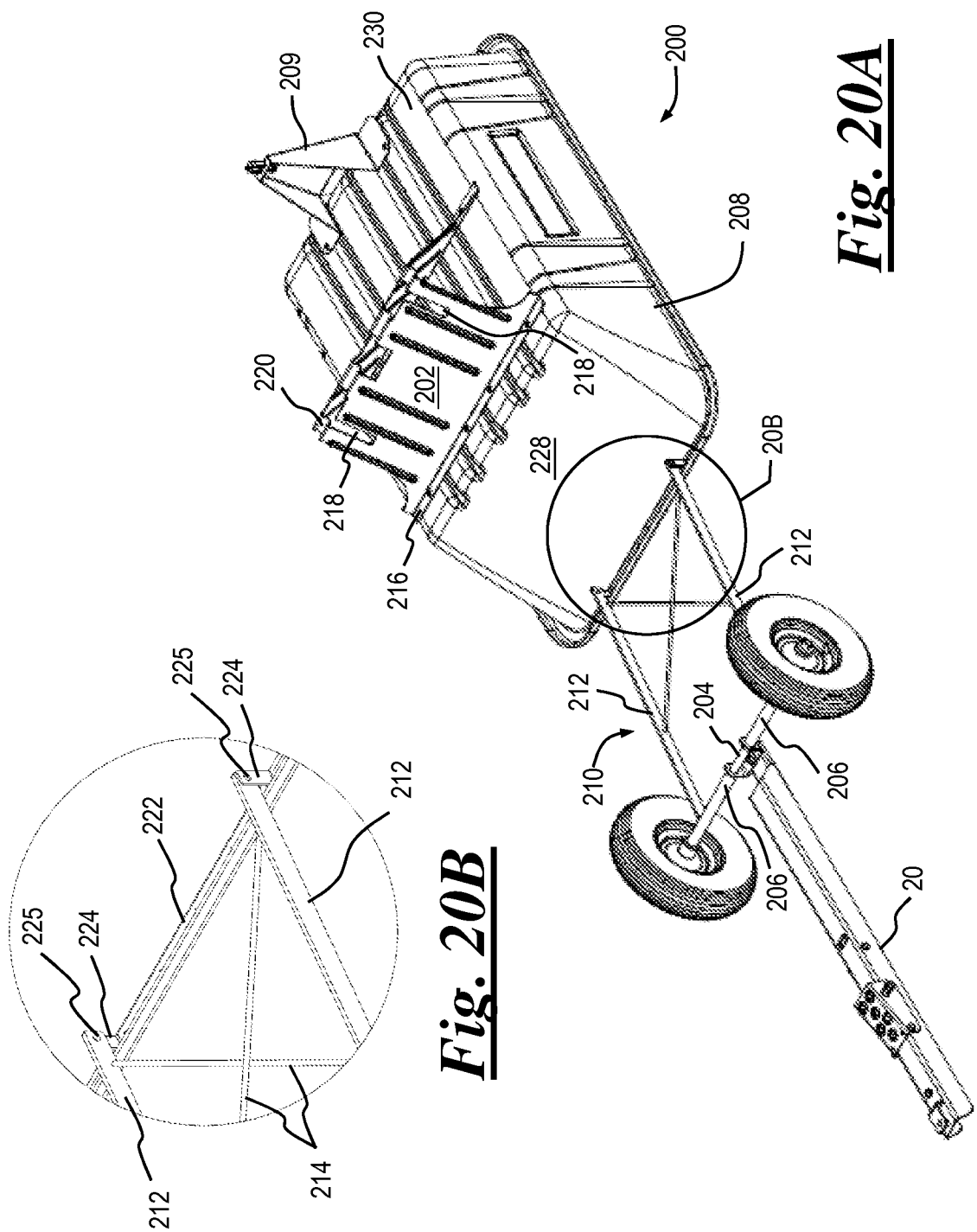

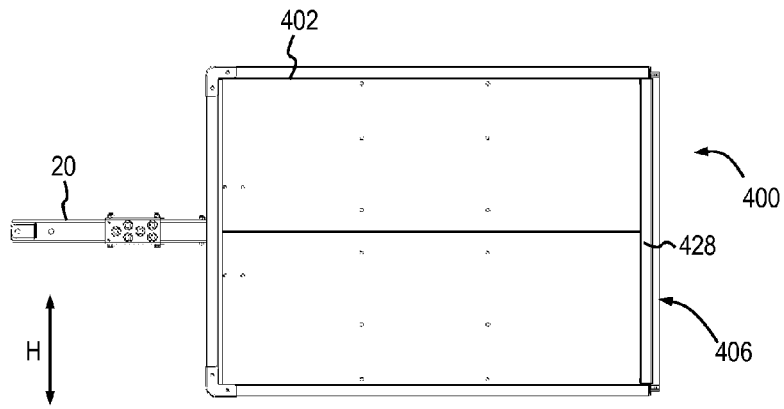
*Fig. 29A*
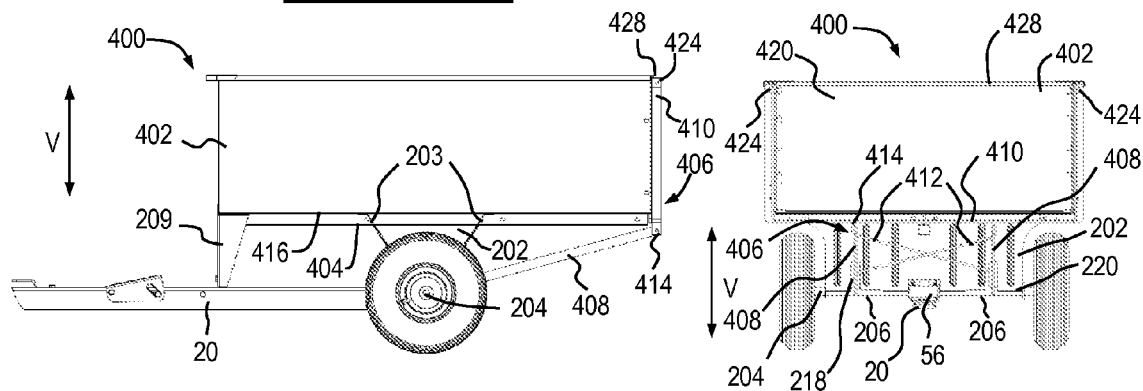
*Fig. 29B*   *Fig. 29C*
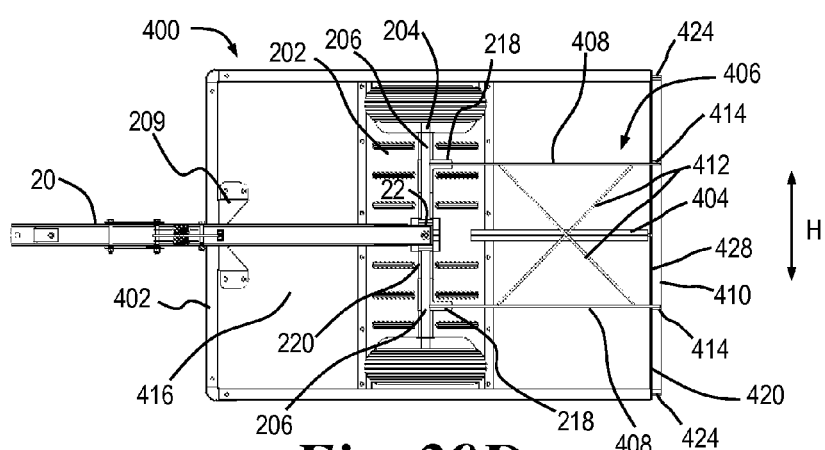
*Fig. 29D*

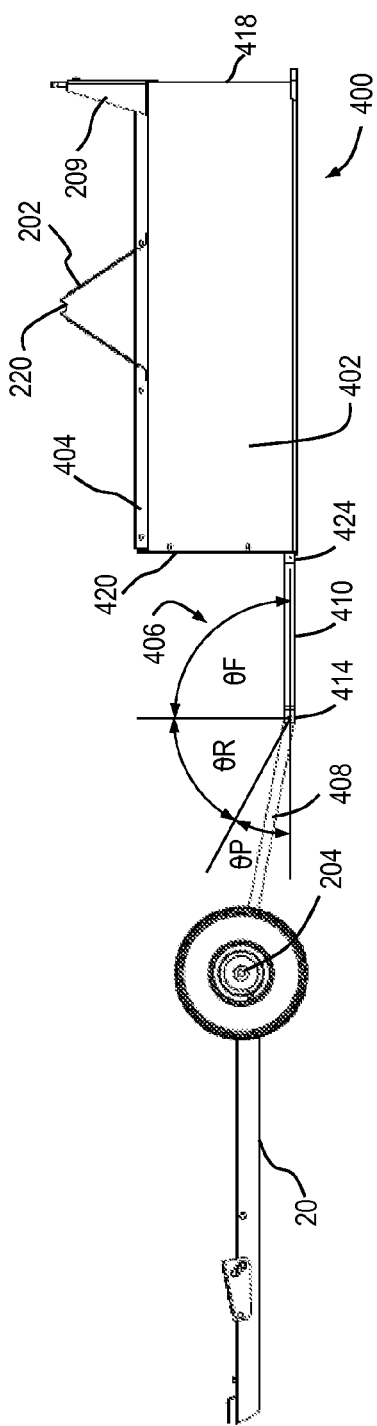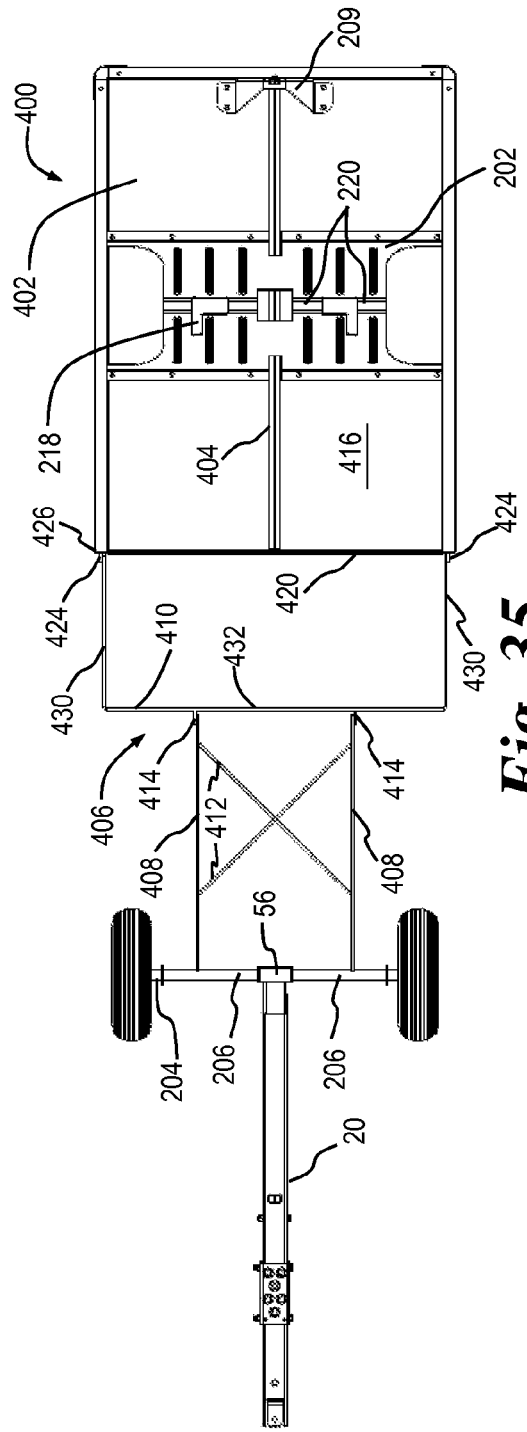

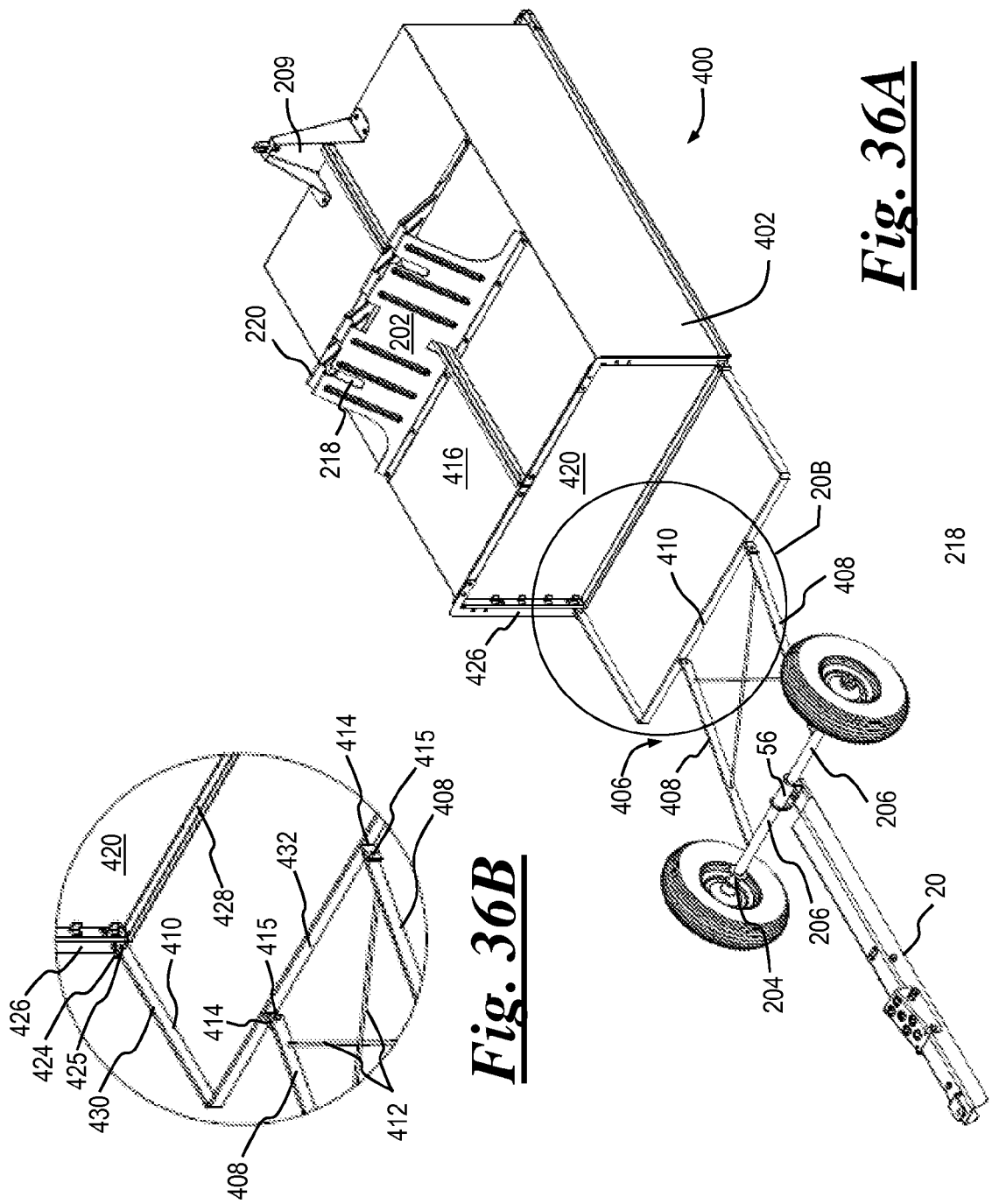

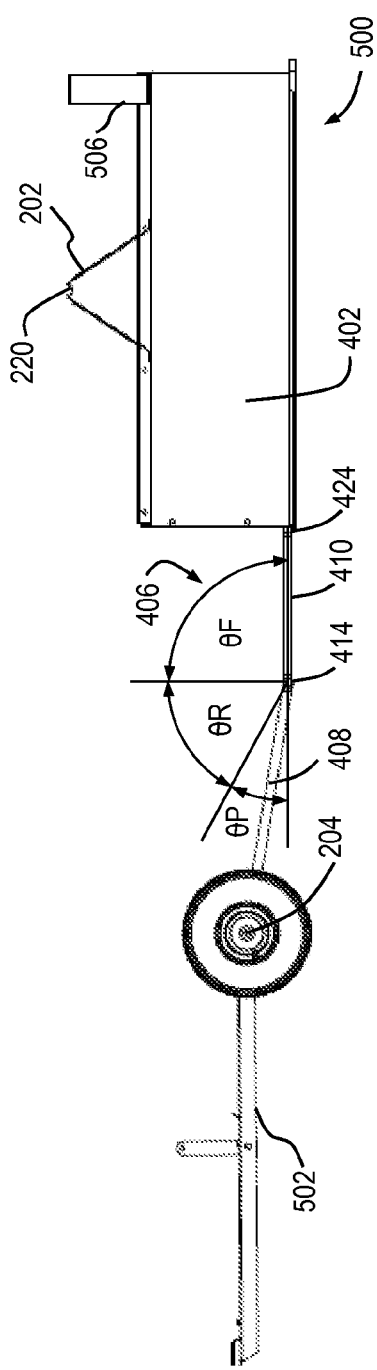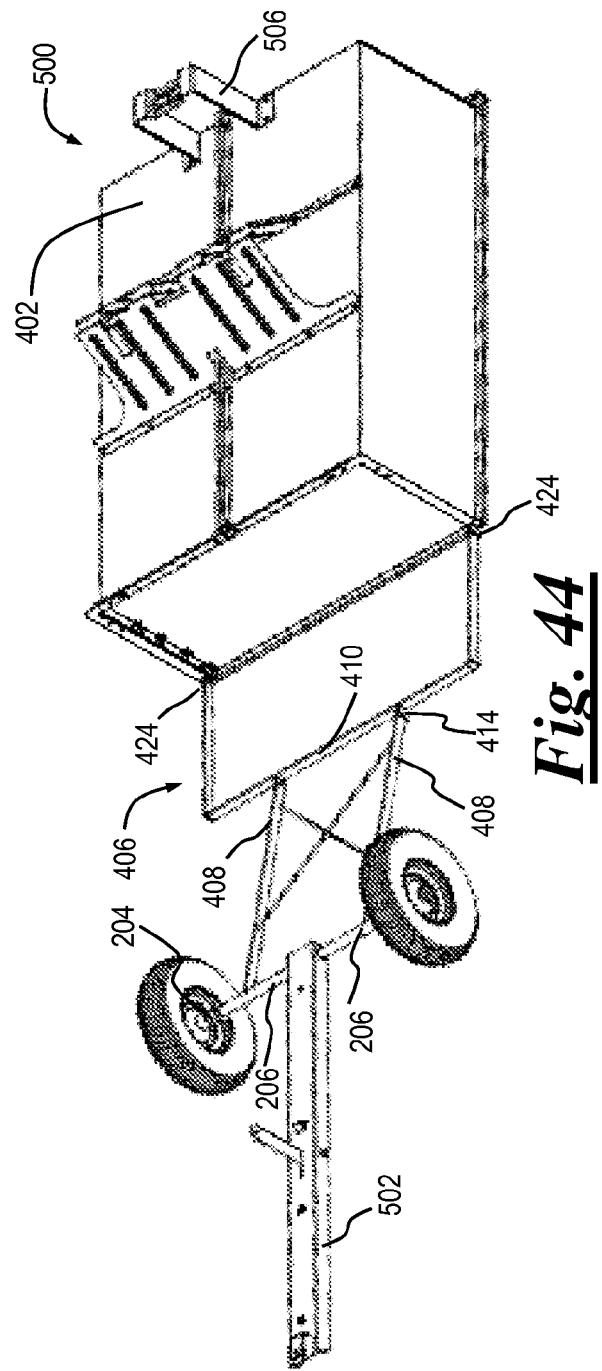

LAWN AND GARDEN CART WITH WIDE-RANGE PIVOTABLE CONTAINER

This application is continuation-in-part of U.S. patent application Ser. No. 13/953,455, filed Jul. 29, 2013, which is a division of U.S. patent application Ser. No. 12/875,032, filed Sep. 2, 2010, now U.S. Pat. No. 8,496,298, which claims priority to U.S. provisional application 61/239,147, filed Sep. 2, 2009, the entire contents of each of these applications being hereby incorporated by reference.

FIELD

This invention relates to lawn and garden carts, in particular a cart having a container that is pivotable over a wide-range with respect to an axle of the cart.

BACKGROUND

Various equipment and accessories for use with a lawn tractor are known in the art. In particular, lawn and garden carts are often used as a tool to transport materials such as lawn debris, tools and equipment. Typically, a lawn cart includes an open container that is mounted to a frame and has a base with three or four sides. The frame is in turn supported by two wheels. A tow bar with a hitch extends outwardly from the frame. The hitch is attached to a coupling at the rear of the tractor. Once attached, the cart can be towed about the yard by the lawn tractor to transport the materials loaded into the bed.

A drawback of most current carts is that they must be disconnected from the tractor for dumping, a cumbersome and time-consuming task. In addition, the tow bar is typically rigidly coupled to the axle of the cart, making the cart difficult to maneuver. Known carts with a non-removable container fixed to be pivotably attached to the wheel axle can only rotate about the axle to an angle of up to about 55 degrees. The user may need to resort to manually removing the payload remaining within the container at the rear wall and bottom surfaces. There is a need for a lawn and garden cart with improved maneuverability and a convenient way to rotate the container substantially upside down. There further remains a need for a cart configured so the container can be easily and quickly tipped over at an angle from more than 55 degrees up to about 180 degrees to dump the entire contents without manual handling of the payload.

SUMMARY

A lawn and garden cart with a container that is pivotable over a wide-range is disclosed according to an embodiment of the present invention. The lawn and garden cart includes a container and a frame that is pivotable about a wheel axle. The lawn and garden cart further includes a tip structure that allows the container to continue to rotate to substantially fully dump the load. A tow bar extends from the axle toward the front of the cart, and the container is selectably secured to the tow bar. In a transporting or travel condition the container is secured to the tow bar to stably receive and transport materials placed or loaded into the container. The container is movable between the loading and unloading conditions over a pivoting range greater than ninety degrees. The container is pivotable from the loading conditions through a plurality of dump angles to reach the unloading condition. In an unloading condition the container is released from the tow bar and moves away from the tow bar, the frame pivoting about the axle through a first dumping angle. The container frame may then be detached from the axle and the container further pivoted about the tip structure through a second or third dumping angle. This allows for the container to be movable to an unloading condition through an angle of about 180 degrees relative to the loading condition so the payload can be entirely unloaded from the container. In one embodiment, the tow bar is configured to pivot laterally with respect to the axle, increasing the maneuverability of the cart.

One embodiment of the present invention is a towable cart. The towable cart includes an axle, at least one bearing rotatably coupled to the axle, a frame configured for selectable attachment to the bearing, and a container attached to the frame. A tow bar has a first and a second end, and is coupled to the axle at the first end of the tow bar. A tip structure has a first and a second end. The first end of the tip structure is pivotally coupled to the container and the second end of the tip structure is fixedly attached to the bearing. An arm is attached to the container and is selectably coupled to the tow bar. The container is in a loading condition when the arm is coupled to the tow bar and is in an unloading condition when the arm is not coupled to the tow bar. The container is movable between the loading condition and the unloading condition over a pivoting range greater than ninety degrees.

In another embodiment of the present invention a towable cart includes an axle, at least one bearing rotatably coupled to the axle, a frame configured for selectable attachment to the bearing, and a container attached to the frame. A tow bar has a first and a second end, and is coupled to the axle at the first end of the tow bar. A tip structure has a first and a second end. The first end of the tip structure is pivotally coupled to the container and the second end of the tip structure is fixedly attached to the bearing. An arm has a first end and a second, opposing end, with a notch extending from the second end of the arm. The first end of the arm is attached to the container and the second end of the arm is received by and selectably coupled to the tow bar. A latch is configured to selectably couple the arm to the tow bar and the notch extends into the tow bar when coupled. The container is in a loading condition when the arm is coupled to the tow bar and is in an unloading condition when the arm is not coupled to the tow bar. The container is movable between the loading condition and the unloading condition over a pivoting range greater than ninety degrees.

BRIEF DESCRIPTION OF THE DRAWINGS

Further features of the inventive embodiments will become apparent to those skilled in the art to which the embodiments relate from reading the specification and claims with reference to the accompanying drawings, in which:

FIGS. 5A, 5B and 5C show top, side and sectional views respectively of the tow bar of FIG. 4;

FIG. 6 is a perspective view of the cart of FIG. 3;

FIG. 18 is a side view of the cart of FIG. 13 with a container of the cart in an unloading condition pivoted to a second dump angle θT;

FIG. 19 is a bottom view of the cart of FIG. 18;

FIGS. 20A and 20B are a perspective view and a close-up view respectively of the tip bracket of the cart of FIG. 18;

FIGS. 29A, 29B, 29C and 29D are top, side, rear and bottom views respectively of the cart of FIG. 28;

FIG. 34 is a side view of the cart of FIG. 28 with a container of the cart in an full unloading position pivoted to a third dump angle θF;

FIG. 35 is a bottom view of the cart of FIG. 34;

FIGS. 36A and 36B are a perspective view and a close-up view respectively of the tip structure of the cart of FIG. 34;

FIG. 43 is a side view of the cart of FIG. 37A with a container of the cart in an unloading condition pivoted to a third dump angle θF; and FIG. 44 is a perspective view of the cart of FIG. 43.

DETAILED DESCRIPTION

Figure 1:
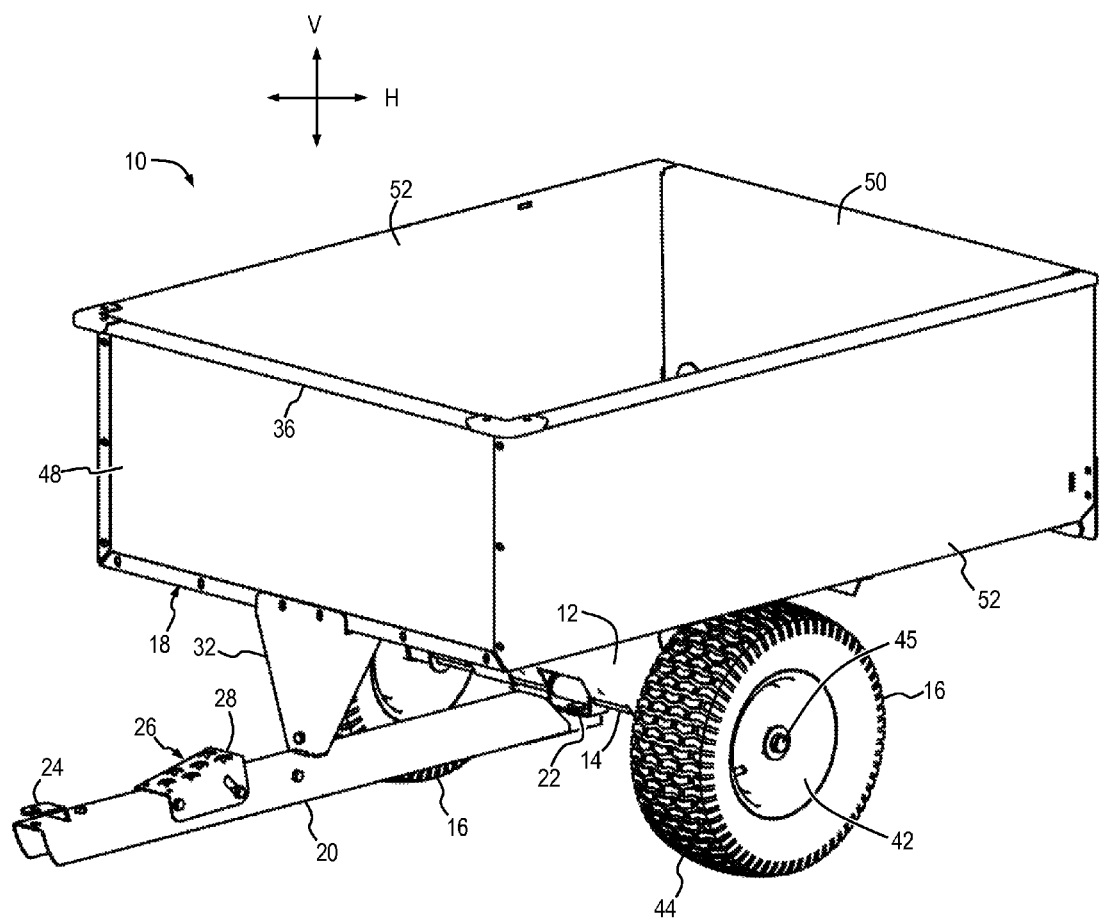
FIG. 1 is a perspective view showing the general arrangement of a lawn and garden cart according to an embodiment of the present invention.

In the discussion that follows, like reference numerals are used to refer to like elements and structures in the various figures.

Figure 2A:
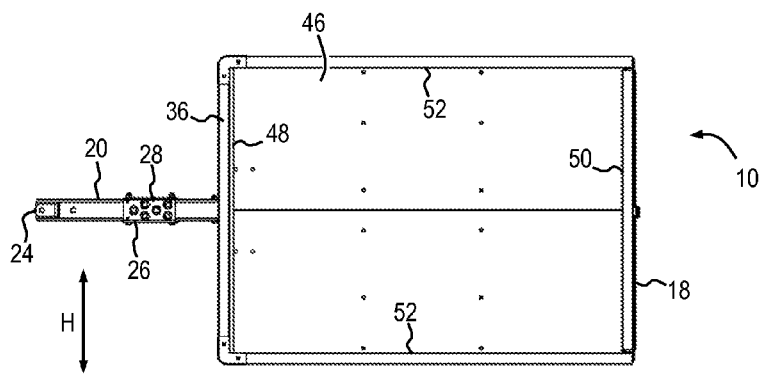
FIGS. 2A, 2B, 2C and 2D are top, side, front and bottom views respectively of the cart of FIG. 1.
Figure 2B:
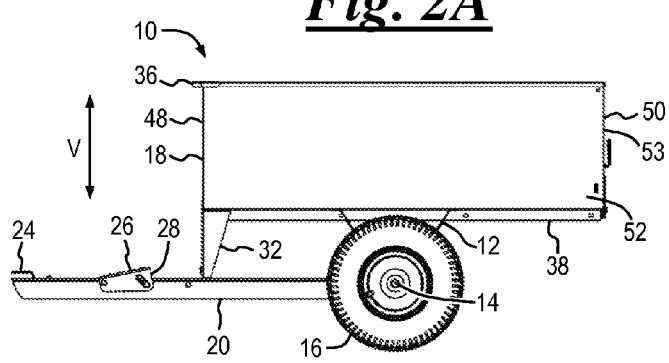
Figure 2C:
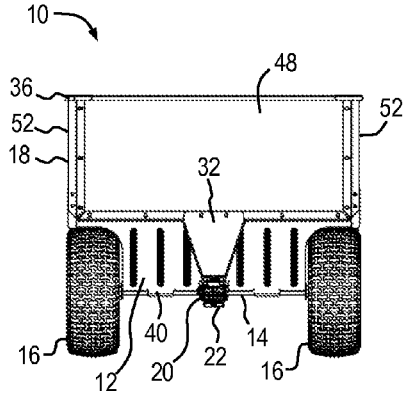
Figure 2D:
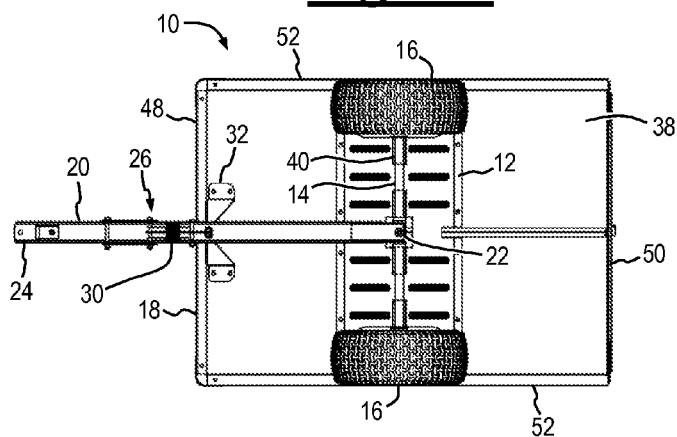
Figure 3:
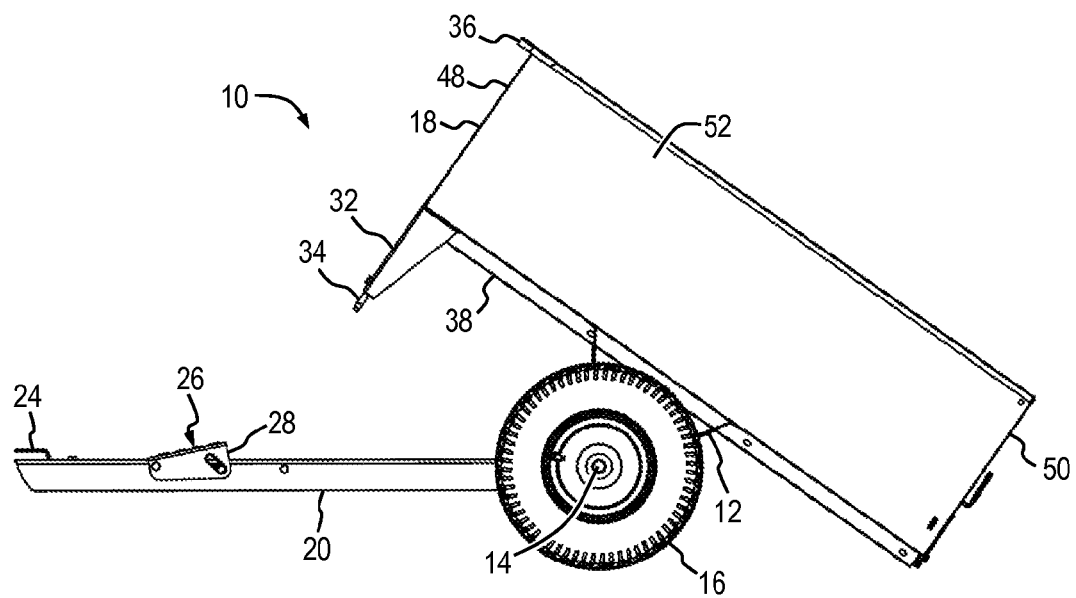
FIG. 3 is a side view of the cart of FIG. 1 with a container of the cart in an unloading condition.

The general arrangement of a lawn and garden cart (hereafter "cart") 10 is depicted in FIGS. 1 through 3 according to an embodiment of the present invention. Cart 10 includes a frame 12 having an axle 14 to which a pair of wheels 16 are rotatably attached. A container 18 is also attached to frame 12. A tow bar 20 is pivotably coupled to axle 14 by a connector 22 at a first end, the connector allowing the tow bar to both pivot and move laterally with respect to the axle. A hitch 24 at an opposing second end of tow bar 20 facilitates coupling of cart 10 to a lawn tractor (not shown) or other towing device for travel. In an alternative embodiment cart tow bar 20 is configured for a handle or tow line (not shown) to allow for pulling or pushing of cart 10 in a travel condition. In the travel condition, wheels 16 allow for movement of cart 10 by a towing device or manually to a receiving or discharge site. Cart 10 also includes a latch 26 having a biased, pivotable lever 28 that is coupled to a slidable member 30. An arm 32 has first and second opposing ends, the first end of the arm being attached to the container 18 and the second end being selectably secured or coupled to the tow bar 20. The arm 32 extends from container 18 and through an opening 33 of tow bar 20, a notched end 34 of the second end of the arm being selectably engaged by slidable member 30 to secure or couple the arm (and thus the container 18) to the tow bar.

Frame 12 receives axle 14 at a first end, while an opposing second end of the frame is attached to an underside 38 of container 18, as shown in FIGS. 2B, 2C and 2D. Frame 12 may be generally V-shaped as shown, or may be made in any other suitable shape within the scope of the invention. Frame 12 may be made from any material or combination of materials suitable for the expected structural load and environment for cart 10 including, without limitation, metal, composites and engineered plastics. In addition, frame 12 may be formed in any conventional manner, such as by molding, casting, machining, cold forming and forging. Frame 12 may be finished in any conventional manner, such as painting, powder coating, plating, or may be unfinished.

Axle 14 is attached to frame 12 with one or more axle connectors 40 and is oriented generally parallel to the underside 38 of container 18, as shown in FIGS. 2B, 2C and 2D. In some embodiments of the present invention axle 14 may be configured to rotate within axle connectors 40 of frame 12. Alternatively, axle 14 may be rigidly coupled to axle connectors 40.

Wheels 16 are attached to opposing ends of axle 14, as shown in FIGS. 2C and 2D. Wheels 16 may include bearings or rotating bushings (not shown) interposed between the wheel and axle 14. Alternatively, wheels 16 may be rigidly attached to axle 14, the axle being rotatable within axle connectors 40 in the manner previously discussed. Wheels 16 may be formed from a unitary piece of any material suitable for the expected structural load and environment for lawn and garden cart 10. Alternatively, wheels 16 may include a rim 42 and a pneumatic or solid tire 44, as shown in FIG. 1. Wheels 16 are preferably removable and may be secured to axle 14 with fasteners 45 (FIG. 1) including, without limitation, bolts, screws, nuts, press-fit caps, lugs and pins.

Container 18 is sized and shaped to receive materials including, without limitation, firewood, lawn debris, fertilizer, soil, tools and equipment. Container 18 may include a bottom 46, a front wall 48, an opposing rear wall 50 and a pair of opposing, spaced-apart sidewalls 52. Front wall 48, rear wall 50 and sidewalls 52 may be oriented generally at right angles to bottom 46, as shown in FIGS. 1 through 3. Alternatively, one or more of front wall 48, rear wall 50 and sidewalls 52 may be oriented at an acute or obtuse angle with respect to bottom 46. In some embodiments rear wall 50 includes a rear gate 53 configured for opening or removal to allow access to the load inside the container 18. The rear gate 53 may be configured to slide out or pivot open from the rear wall 50. Container 18 may be made of any material or combination of materials suitable for the expected structural load and environment for cart 10 including, without limitation, metal, composites and engineered plastics. In addition, container 18 may be formed in any conventional manner, such as by molding, casting, machining, cold forming and forging, and may be made as a unitary component or from components and assembled. Furthermore, container 18 may be finished in any conventional manner, such as painting, powder coating, plating, or may be unfinished.

Figure 7:
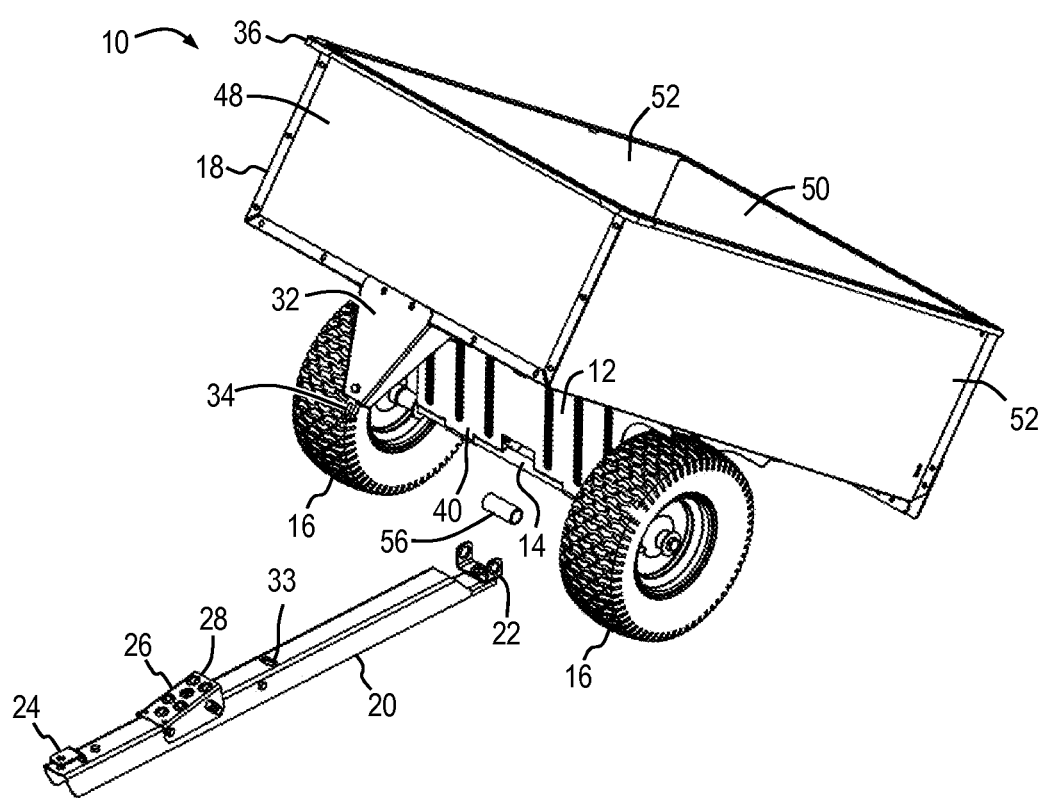
FIG. 7 shows the tow bar of the cart separated from the axle of the cart of FIG. 1.

With reference to FIGS. 4 and 5A, 5B and 5C, tow bar 20 is generally elongate and is attached to frame 12 at a first tow bar end. Tow bar 20 extends outwardly from frame 12 and is detachably engageable with axle 14, the axle being slid through a bracket 54 and disposed between a pair of tabs 55 of the bracket, as depicted in FIGS. 6 and 7. A support spacer 56 may optionally be assembled with bracket 54 on axle 14, as shown in FIGS. 6 and 7. Tow bar 20 may be generally rectangular, having a "U" shape, or may be a closed rectangular box. In other embodiments tow bar 20 may have a generally circular shape. Tow bar 20 may be made of metal, such as steel, or from other materials such as high density plastic and composites.

Figure 4:
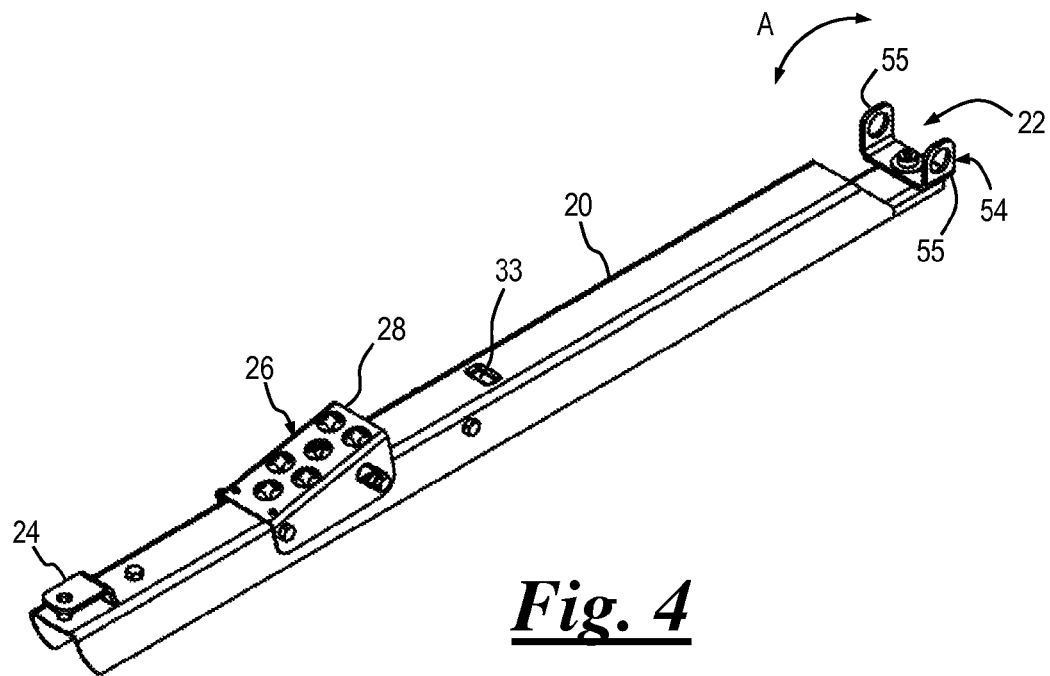
FIG. 4 shows additional features of the tow bar of the cart.
Figure 8:
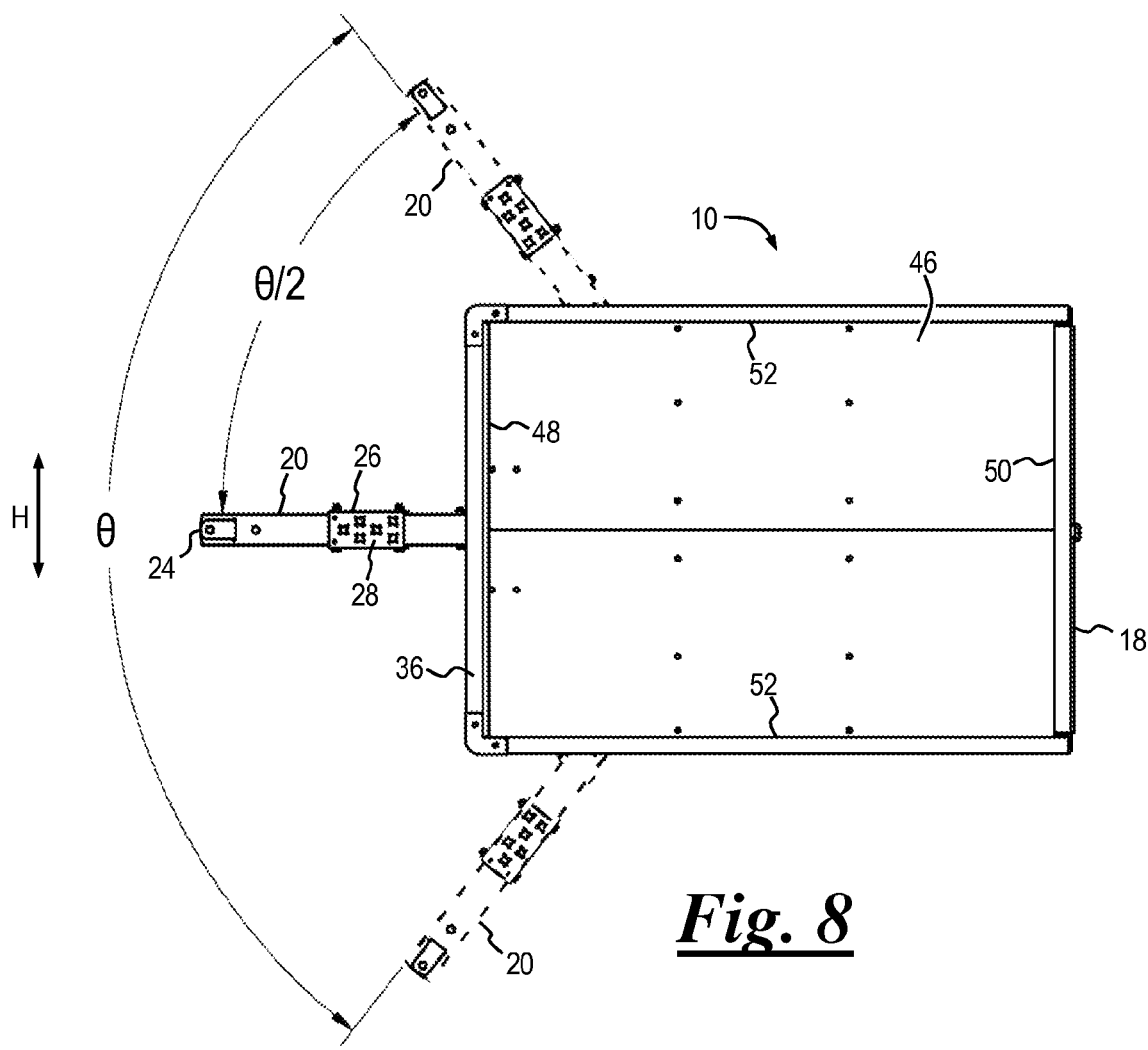
FIG. 8 shows the cart of FIG. 1 with a tow bar that may be moved laterally throughout a range of positions with respect to a towing position.
Figure 9:
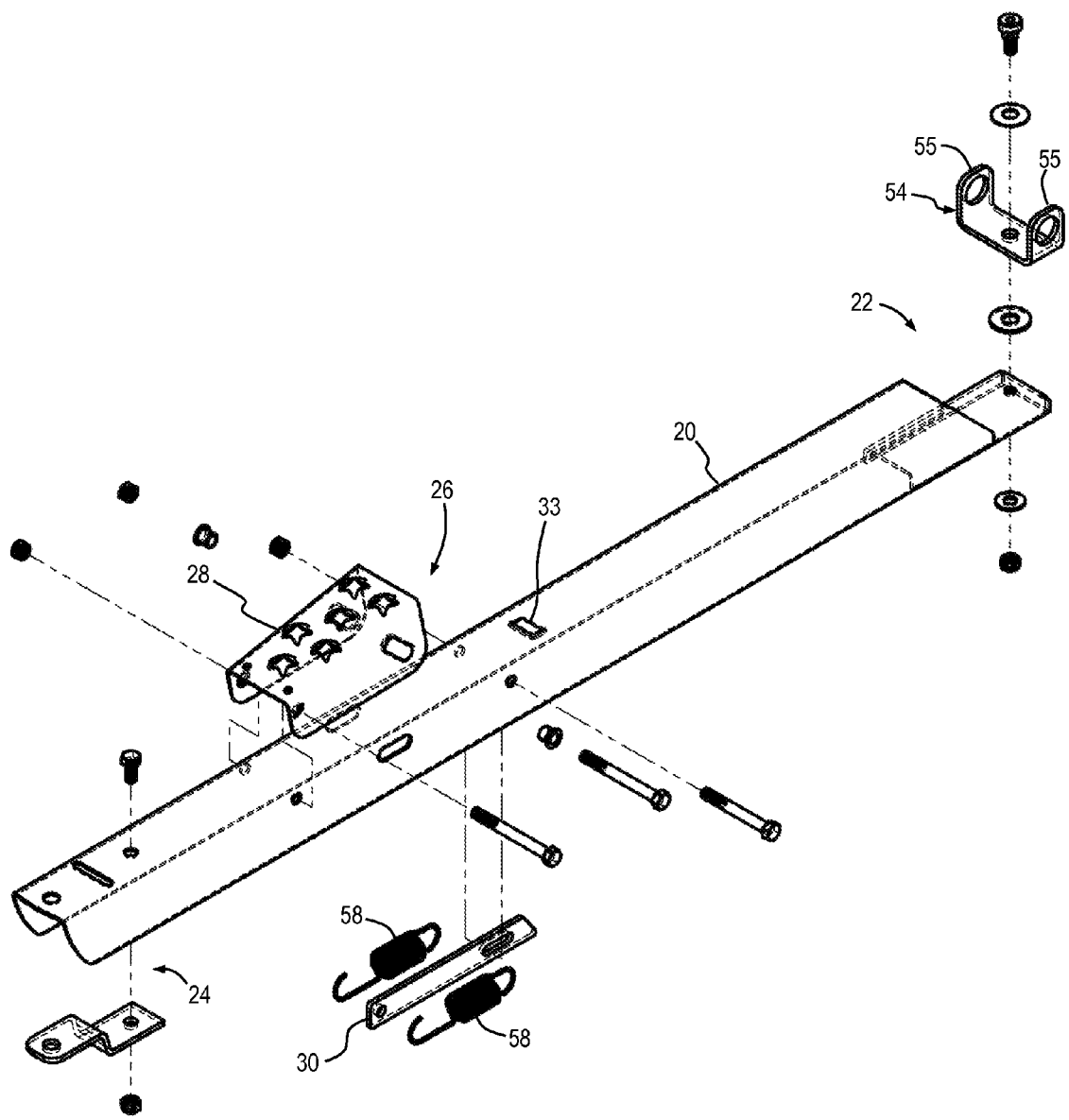
FIG. 9 is an exploded view showing the components of the tow bar of FIG. 4 in greater detail.
Figure 10:
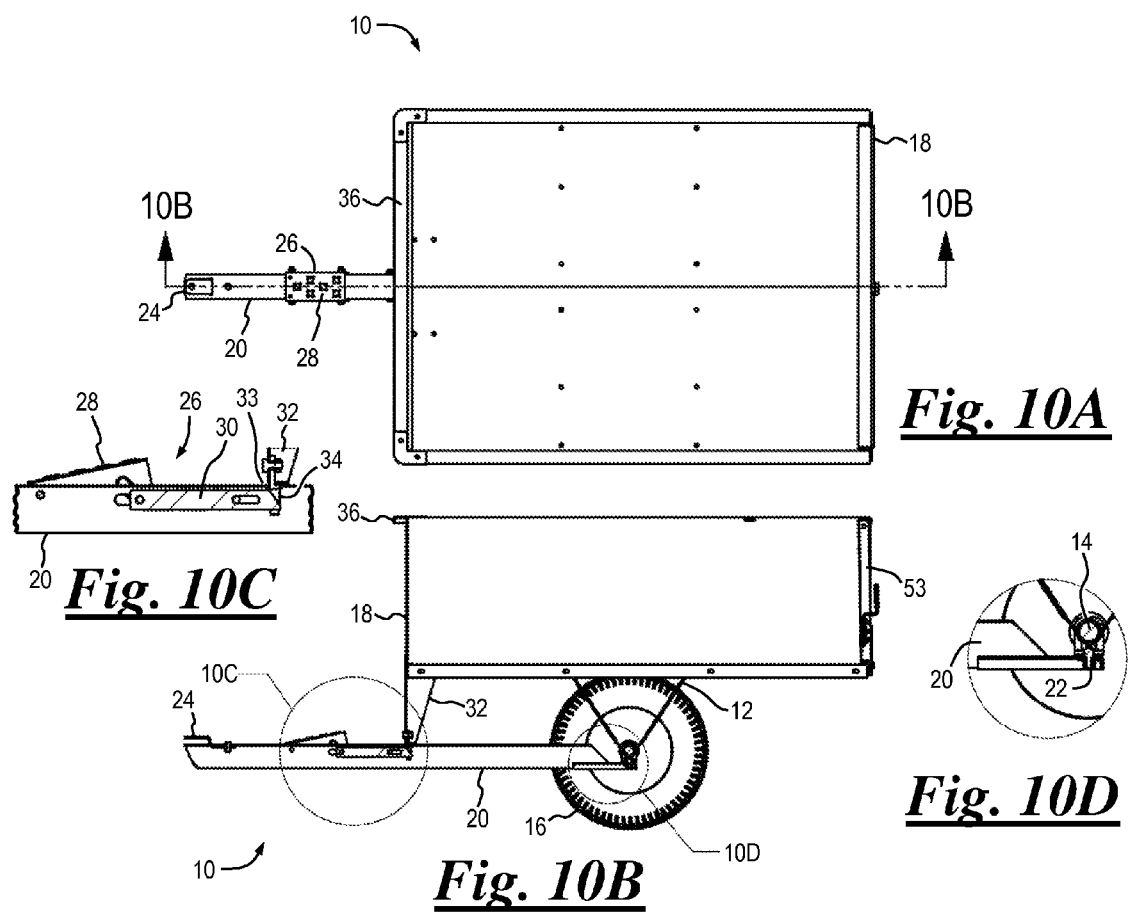
FIGS. 10A and 10B are top and side views respectively of the cart.
FIG. 10C is a close-up view showing further details of the latch of the cart.
FIG. 10D is a close-up view showing further details of the tow bar connector of the cart.

Bracket 54 of tow bar 20 may be made rotatable with respect to the tow bar, as indicated by arrow "A" of FIG. 4. This allows tow bar 20 to be moved laterally within a predetermined range of movement θ as shown in FIG. 8. In one embodiment the lateral movement of tow bar 20 is limited by wheels 16, the tow bar coming into contact with the wheels at opposing lateral extremes.

As shown in FIG. 1, hitch 24 is located at a second end of tow bar 20 distal to frame 14, and is configured to couple cart 10 to a lawn tractor or other towing device (not shown). Hitch 24 may be of any suitable type including a ball hitch, drawbar hitch, sleeve hitch, and three-point hitch.

With reference to FIGS. 1, 9, and 10A through 10D, latch 26 includes slidable member 30, which is biased by one or more biasing elements 58 that urge the slidable member to engage notched end 34 of arm 32 extending away from container 18, thereby selectably securing the container to the tow bar as shown in FIG. 1. Lever 28 is pivotably coupled to tow bar 20 and is also coupled to slidable member 30 such that, when the lever is operated against the bias of biasing elements 58, the slidable member is urged away from notched end 34, thereby releasing arm 32 (and thus container 18) from tow bar 20. In this condition container 18 is free to pivot or rotate about axle 14, as shown in FIGS. 3 and 6.

In use, slidable member 30 is biased to engage notched end 34 of arm 32, thereby securing container 18 to tow bar 20 with the bottom 46 of the container oriented roughly parallel to the tow bar and the tow bar extending away from the front of cart 10 (FIG. 1). Hitch 24 is coupled to a lawn tractor or other towing device. Cart 10 may moved about as needed, container 18 being filled by the user with material as desired. In a loading condition, arm 32 is secured or coupled to tow bar 20 and bottom 46 of container 18 is generally parallel to the tow bar. In an unloading condition, arm 32 is uncoupled from the tow bar 20, and container 18 is movable to pivot away from the tow bar to dump the load.

When it is desired to unload the contents of container 18 a user actuates lever 28, urging slidable member 30 away from notched end 34 of arm 32, thereby releasing the arm from the tow bar. The user may then grasp a front lip 36 of container 18 and pivot the container about axle 14, away from tow bar 20 (FIGS. 3, 6). With latch 26 released and container 18 pivoted away from tow bar 20, the tow bar is further laterally movable with respect to axle 14, allowing the user to maneuver cart 10. For example, the user may simply pivot container 18 away from tow bar 20 on a vertical axis "V" (FIG. 2B) if it is desired to dump the contents of the container straight back. The user may also pivot the tow bar 20 to any lateral angle about a horizontal axis "H" (FIG. 2A) within the range θ with respect to axle 14 (FIG. 8) by means of connector 22 to manipulate the container to a preferred position and then unload the contents to the right or left.

Figure 11:
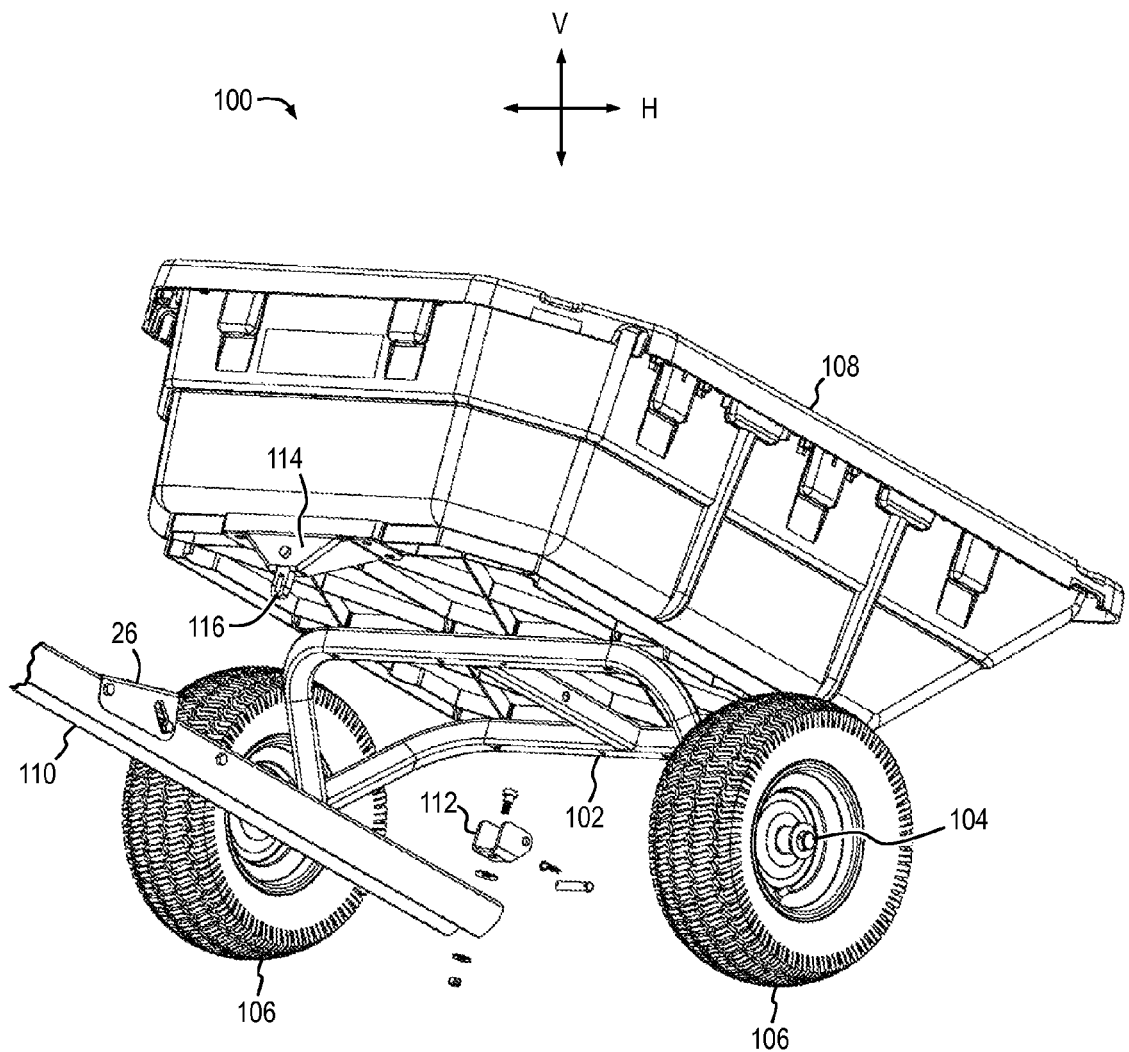
FIG. 11 is a perspective view showing the general arrangement of a lawn and garden cart according to another embodiment of the present invention, showing the assembly of a tow bar connector.
Figure 12:
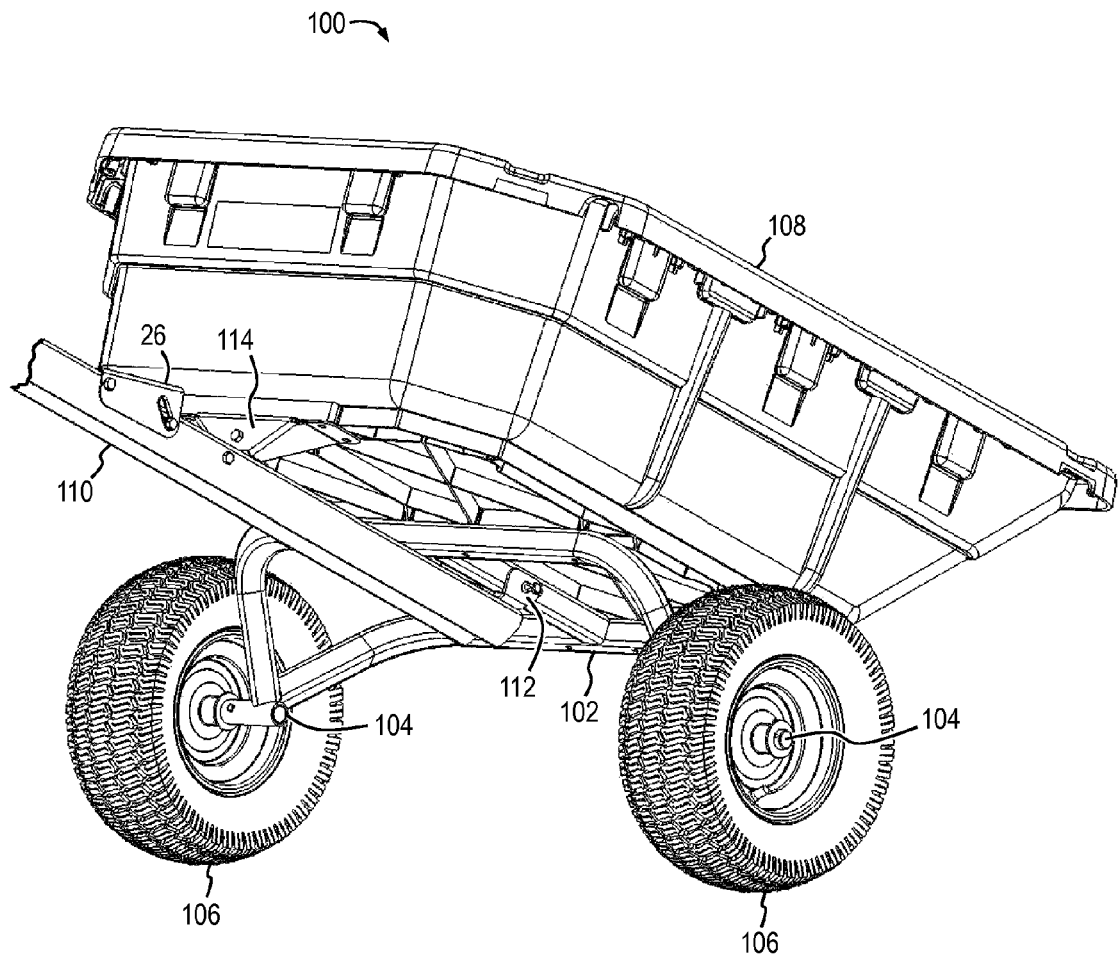
FIG. 12 is a perspective view of the lawn and garden cart of FIG. 11 with the tow bar assembled to the cart.
Figure 13:
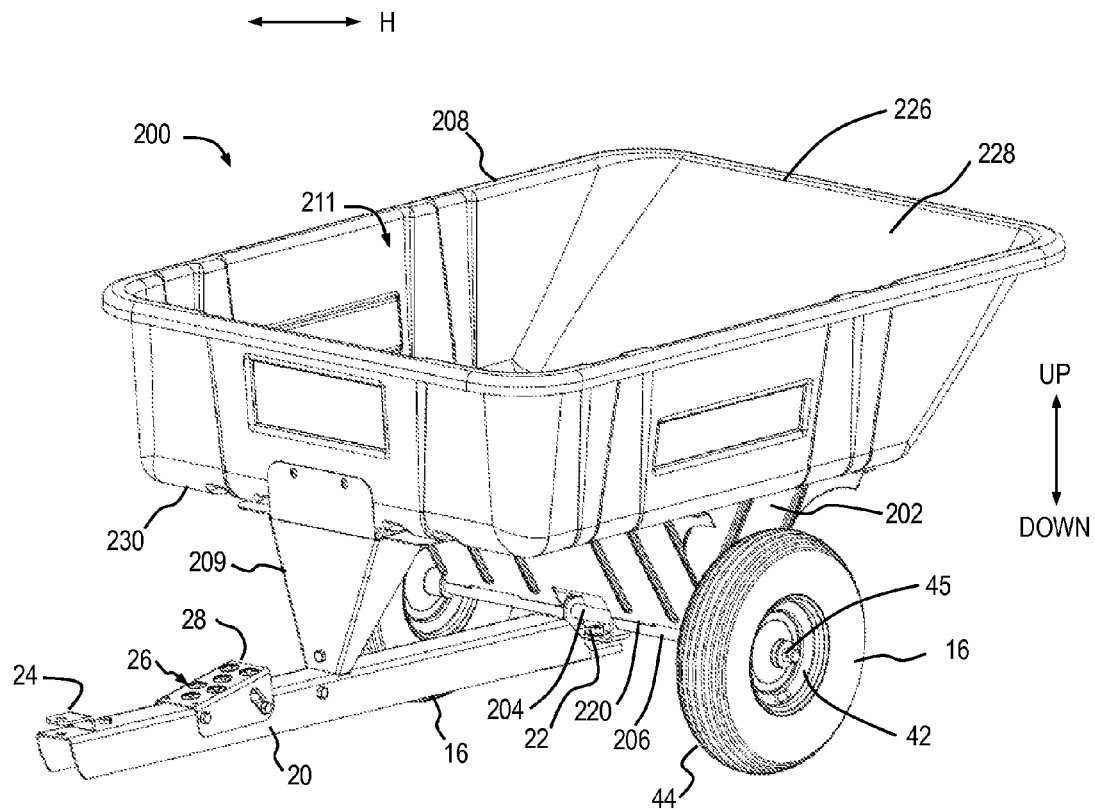
FIG. 13 is a perspective view showing the general arrangement of a lawn and garden cart according to another embodiment of the present invention, showing the tow bar assembled to the cart.

The general arrangement of a cart 100 is depicted in FIGS. 11 and 12 according to another embodiment of the present invention. Cart 100 includes a frame 102 having a pair of axles 104, each axle having a wheel 106 rotatably attached. A container 108 is also attached to frame 102. A tow bar 110 is pivotably coupled to frame 102 by a connector 112 at a first end, the connector allowing the tow bar both to pivot and move laterally with respect to the frame. A hitch 24 (FIGS. 1, 9) at an opposing second end of tow bar 110 facilitates coupling of cart 100 to a lawn tractor (not shown) or other towing device. Cart 100 also includes a latch 26 having a biased, pivotable lever 28 that is coupled to a slidable member 30. Details of latch 26 and its associated components are provided above and are illustrated in FIGS. 9 and 10A-10D. An arm 114 has first and second opposing ends, the first end of the arm being attached to the container 108 and the second end being selectably secured or coupled to the tow bar 110. The arm 114 extends from container 108 and through an opening (not shown) of tow bar 110, a notched end 116 of the second end of the arm being selectably engaged by slidable member 30 to secure or couple the arm (and thus the container 108) to the tow bar. Cart 100 is otherwise similar to cart 10 and thus will not be detailed further here.

The general arrangement of a cart 200 is depicted in FIGS. 13 through 20B according to another embodiment of the present invention. Cart 200 includes a frame 202 and an axle 204 to which a pair of wheels 16 are rotatably attached. The axle 204 may include at least one bearing 206 that is rotatably coupled to the axle. In this embodiment a first end of the frame 202 is configured for selectable attachment to a pair of bearings 206. A container 208 is attached to a second, opposing end of the frame 202. A tow bar 20 is pivotably coupled to axle 204 by a connector 22 at a first end, the connector allowing the tow bar to both pivot and move laterally with respect to the axle. A hitch 24 at an opposing second end of tow bar 20 facilitates coupling of cart 200 to a lawn tractor (not shown) or other towing device. Cart 200 also includes a latch 26 having a biased, pivotable lever 28 that is coupled to a slidable member 30. An arm 209 has first and second opposing ends, the first end of the arm being attached to the container 208 and the second end being selectably secured to the tow bar 20. The arm 209 extends from container 208 and through an opening 33 of tow bar 20, a notch or notched end 34 of the second end of the arm being selectably engaged by slidable member 30 to detachably secure the arm (and thus the container) to the tow bar. Details of latch 26 and its associated components are provided above and are illustrated in FIGS. 9 and 10A-10D.

The cart 200 includes a tip structure 210 having first and second ends. The first end of the tip structure 210 is pivotally coupled to the container 208 and the second end of the tip structure is fixedly attached to the bearings 206. In one embodiment bearings 206 may be generally cylindrical, may wrap fully or partially around the axle 204, and may be configured for rotation about the axle. The tip structure 210 allows the container 208 to rotate or pivot over a wide range about the axle 204 and about the first end of the tip structure to substantially fully dump the load (i.e., empty the contents of container 208). In some embodiments cart 200 is configured to allow an opening 211 (or underside 230) of container 208 to be pivoted over a range of about 180 degrees, as discussed further below.

The tip structure 210 includes a pair of opposing and generally parallel side bars 212. A first end of the side bars 212 is pivotally coupled to the container 208 and a second, opposing end of the side bars is fixedly attached to the bearings 206. In an alternative embodiment, in addition to the first end of the side bars 212 being pivotable, the second end of the side bars may likewise be configured for pivotable connection (not shown) to the axle 204. For example, in an alternative embodiment bearings 206 may be omitted, and the second end of the side bars 212 configured with openings (not shown) that rotate about the axle 204.

The tip structure 210 may optionally include one or more cross braces 214 that extend between the side bars 212, and are configured to attach to the side bars so as to provide structural reinforcement. The attachment of the side bars 212 to the bearings 206 and to the cross braces 214 may be by any suitable attachment such as, but not limited to, by welding, clamps, or fasteners.

Container 208 includes a tip bracket 222 attached to a rear lip 226 of a rear wall 228 of the container. The attachment of the tip bracket 222 to the container 208 may be by any suitable attachment, such as by welding, clamps, or fasteners. Alternatively, the tip bracket 222 may be made integral to container 208. The tip bracket 222 includes a pair of spaced-apart tabs 224 (FIG. 20B) that are pivotably coupled to the first ends of the side bars 212. The pivotable attachment of the first ends of side bars 212 to the tabs 224 may be by any suitable attachment, such as by pins 225 that allow the side bars to rotate. In one embodiment, the tip bracket 222 and rear lip 226 of container 208 may be configured to rotate over a range of about 125 degrees about the pins 225. The side bars 212, cross braces 214, and tip bracket 222 may be made of any solid, hollow or other structural cross-section and construction suitable to support the loads applied to the cart 200. In another alternative embodiment, the container 208 and the tip structure 210 may be pivotably connected by one or more hinges (not shown).

Figure 14A:
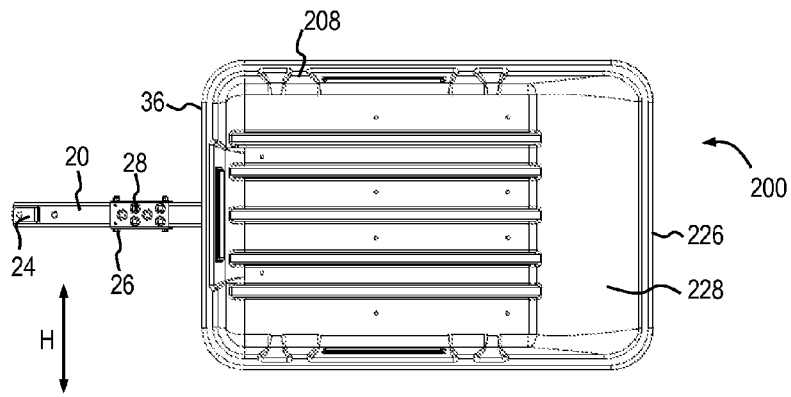
FIGS. 14A, 14B, 14C and 14D are top, side, rear and bottom views respectively of the cart of FIG. 13.
Figure 14B:
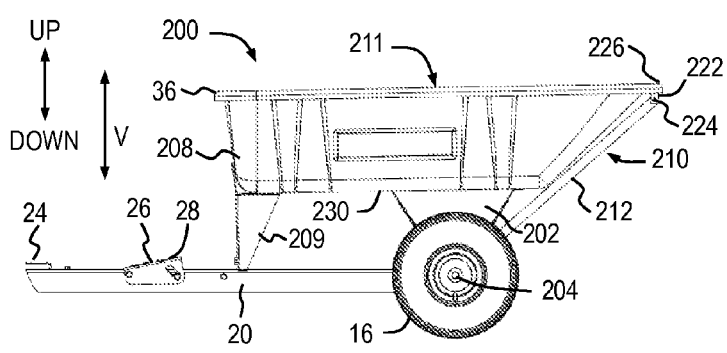
Figure 14C:
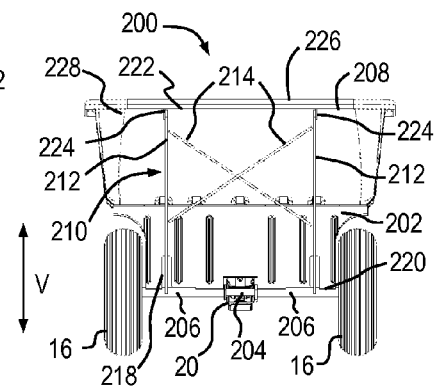
Figure 14D:
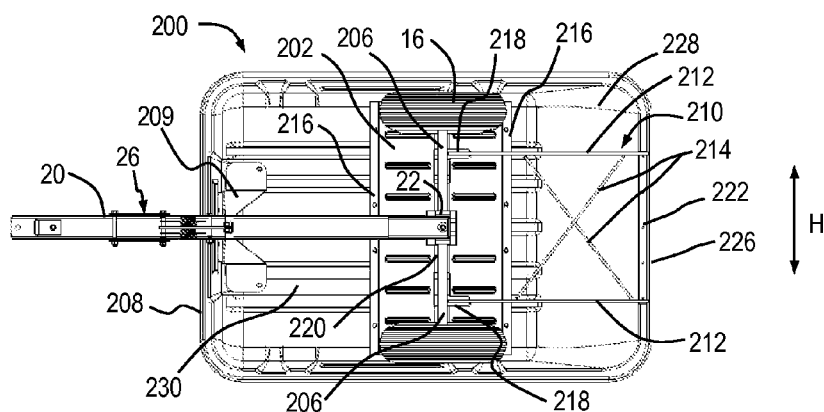
Figure 15A:
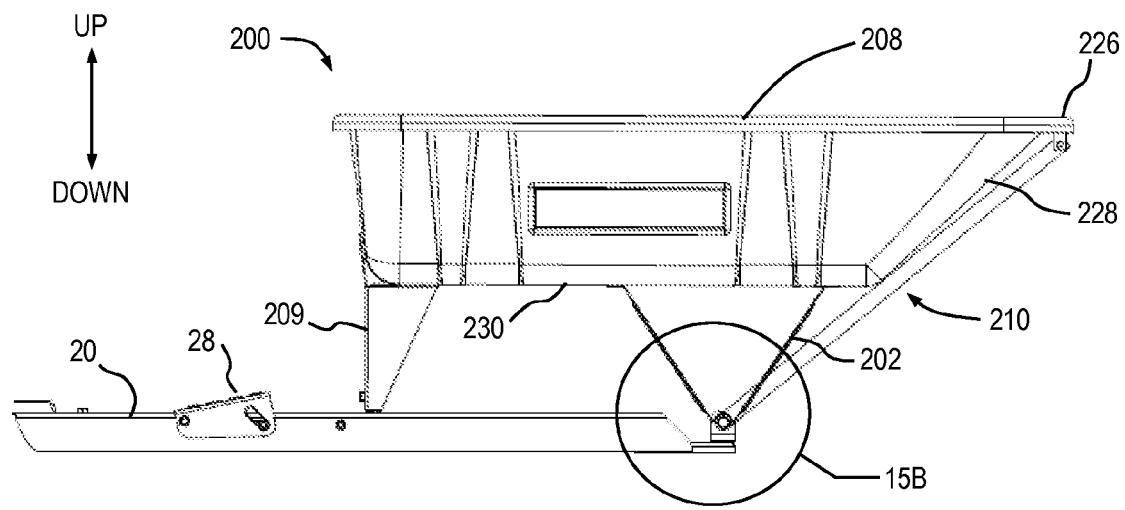
FIGS. 15A and 15B are a side view and a close-up view of the axle of the cart of FIG. 13 with the wheels removed.
Figure 15B:
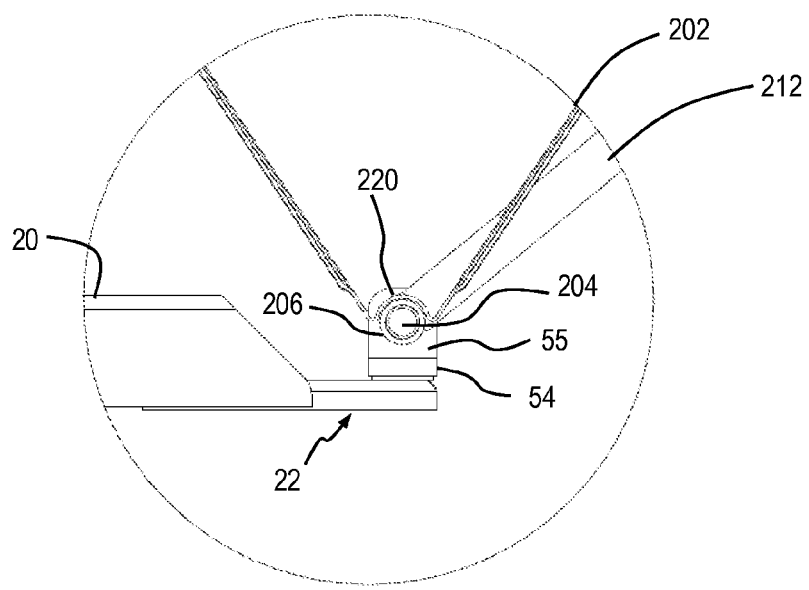

Frame 202 may include a pair of slots 218 (FIG. 20A), each configured to receive at least a portion of a corresponding side bar 212. The first end of frame 202 includes one or more seat portions 220 configured for selectable attachment to the bearings 206 of axle 204 (see, e.g., FIGS. 15B and 20A). The second end of the frame 202 includes one or more flanges 216 that are configured for attachment to an underside 230 of container 208, as shown in FIGS. 14D and 19. Frame 202 may be generally V-shaped as shown, or may be made in any other suitable shape within the scope of the invention.

Container 208 is a multi-walled receptacle configured to receive a load, similar to container 108. A portion of container 208 is accessible through the opening 211 to allow removal of the load. In some embodiments the opening 211 is generally parallel to the underside 230 of the container 208. Cart 200 may optionally include additional structural bracing (not shown) to reinforce the container 208. For example, the cart 200 may include bracing extending from the flanges 216 to the arm 209 or at any other suitable locations along or connected to container 208.

Frame 202, arm 209, axle 204 and bearings 206 may be made from any material or combination of materials suitable for the expected structural load and environment for cart 200 including, without limitation, metal, composites and engineered plastics. In addition, frame 202, arm 209, axle 204 and bearings 206 may be formed in any conventional manner, such as by molding, casting, machining, cold forming and forging. Frame 202, arm 209, axle 204 and bearings 206 may be finished in any conventional manner, such as painting, powder coating, plating, or may be unfinished.

Axle 204 is selectably received by and coupled to frame 202 at one or more seat portions 220 and is oriented generally parallel to the underside 230 of container 208, as shown in FIGS. 14B, 14C, 14D, and 15B. Axle 204 is configured to rotate within bearings 206 and within connector 22 of tow bar 20. In an alternative embodiment, axle 204 may be non-detachably and rotatably coupled to seat portions 220 similar to axle connectors 40, and the frame 202 may be configured for removable attachment to container 208 (not shown).

Figure 16:
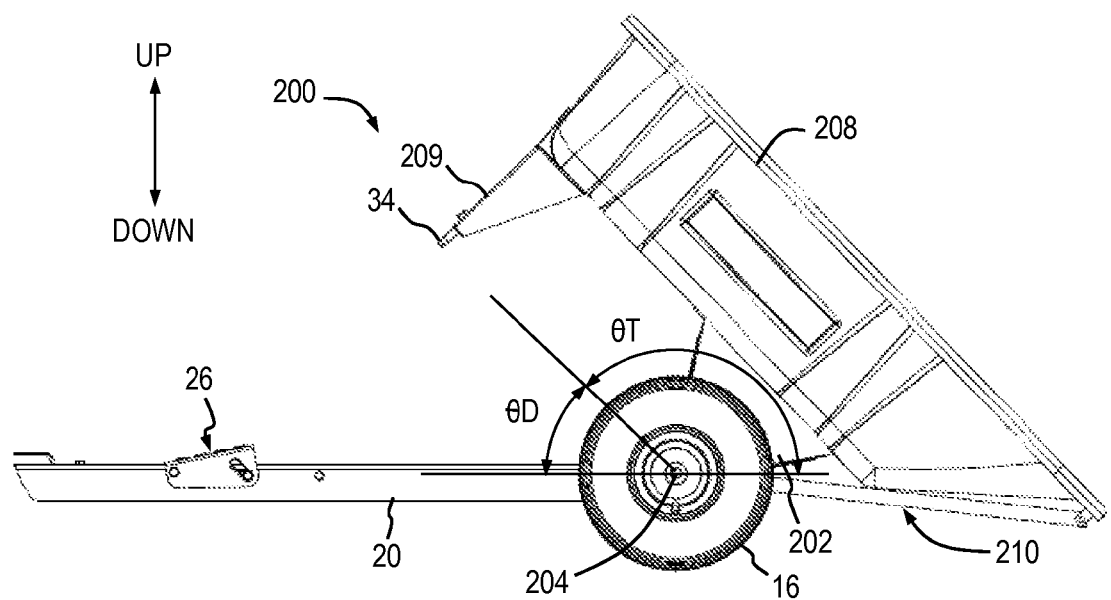
FIG. 16 is a side view of the cart of FIG. 13 with a container of the cart in an unloading condition pivoted to a first dump angle θD.
Figure 17:
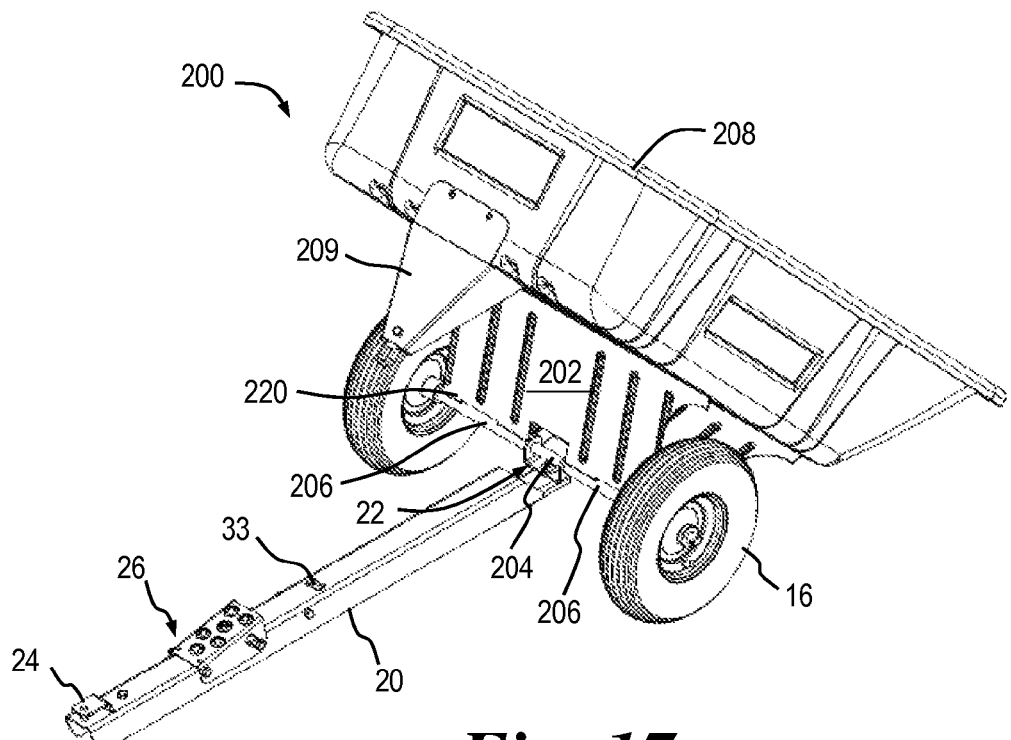
FIG. 17 is a perspective view of the cart of FIG. 16.
Figure 21:
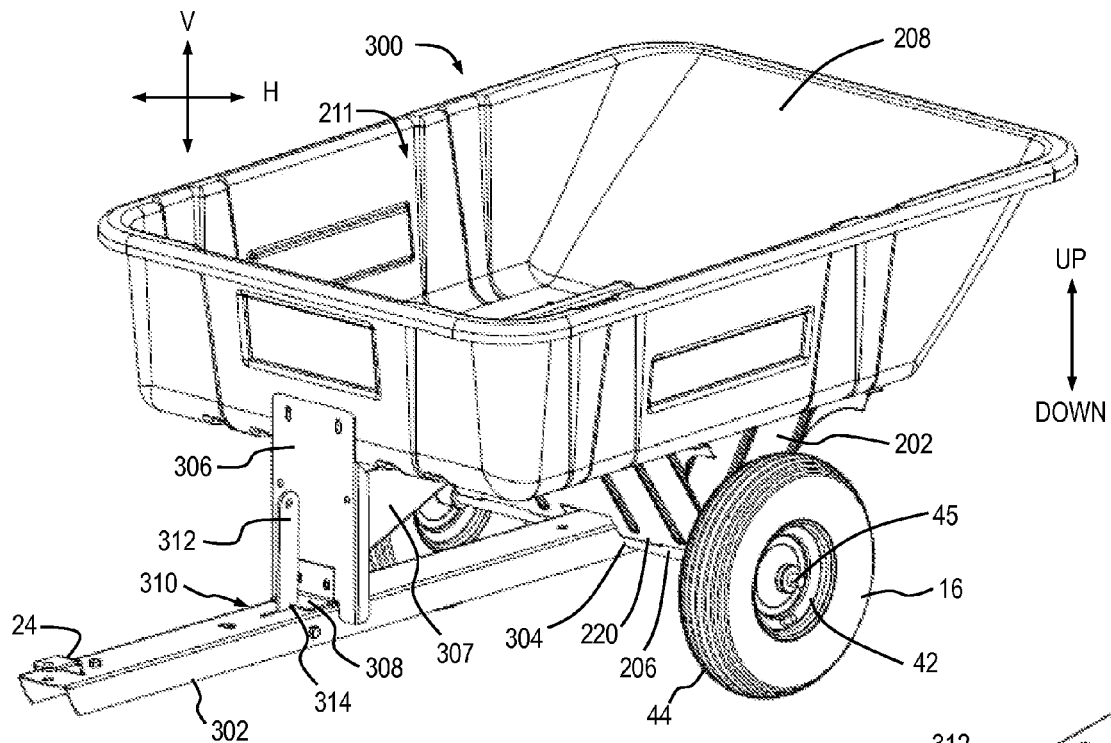
FIG. 21 is a perspective view showing the general arrangement of a lawn and garden cart according to another embodiment of the present invention, showing the tow bar assembled to the cart.
Figure 22A:
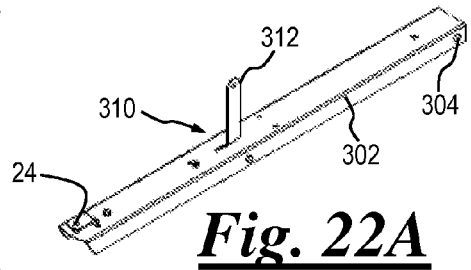
FIGS. 22A, 22B, 22C and 22D show perspective, top, side and sectional views respectively of the tow bar of FIG. 21.
Figure 22B:
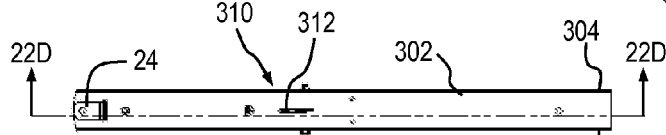
Figure 22C:
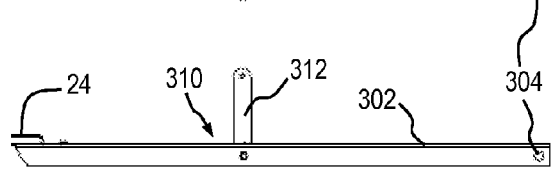
Figure 22D:
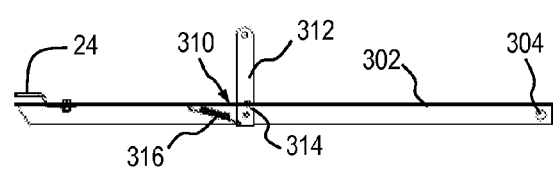
Figure 23A:
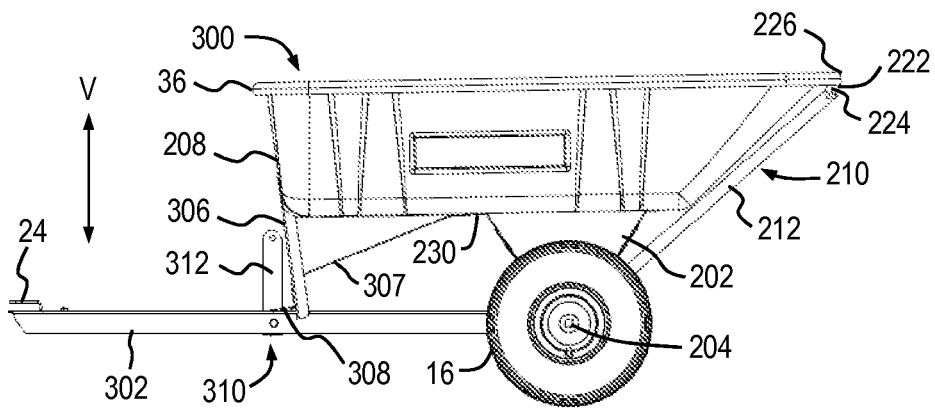
FIGS. 23A, 23B and 23C are side, rear and bottom views respectively of the cart of FIG. 21.
Figure 23B:
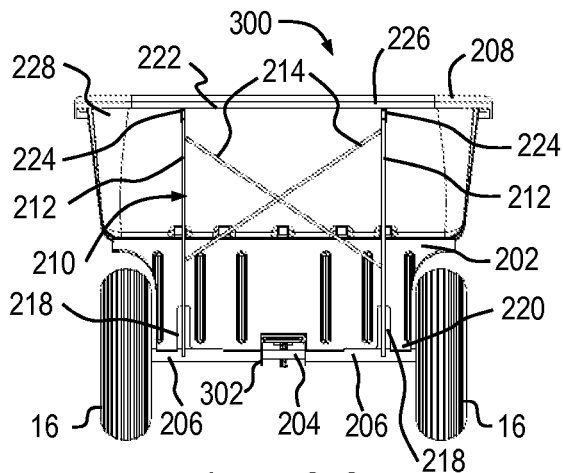
Figure 23C:
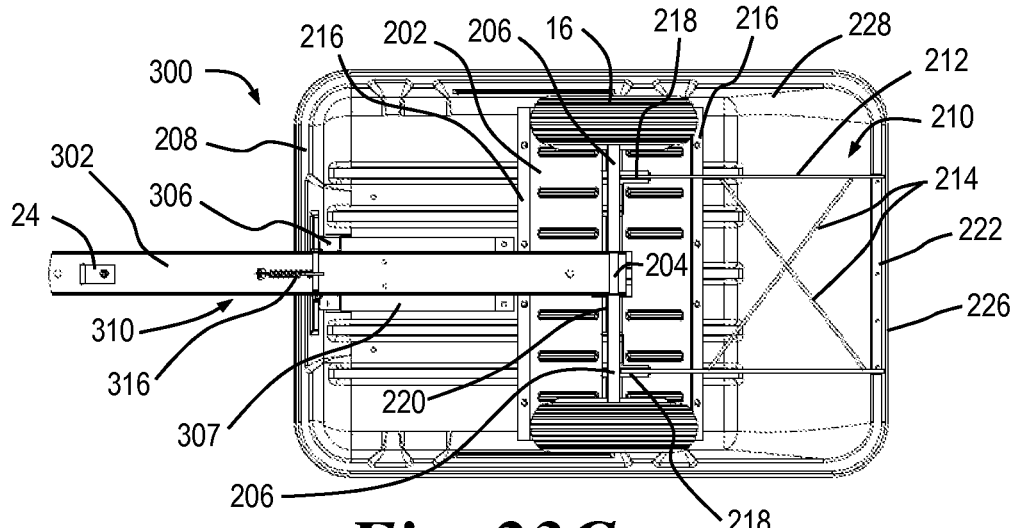
Figure 24:
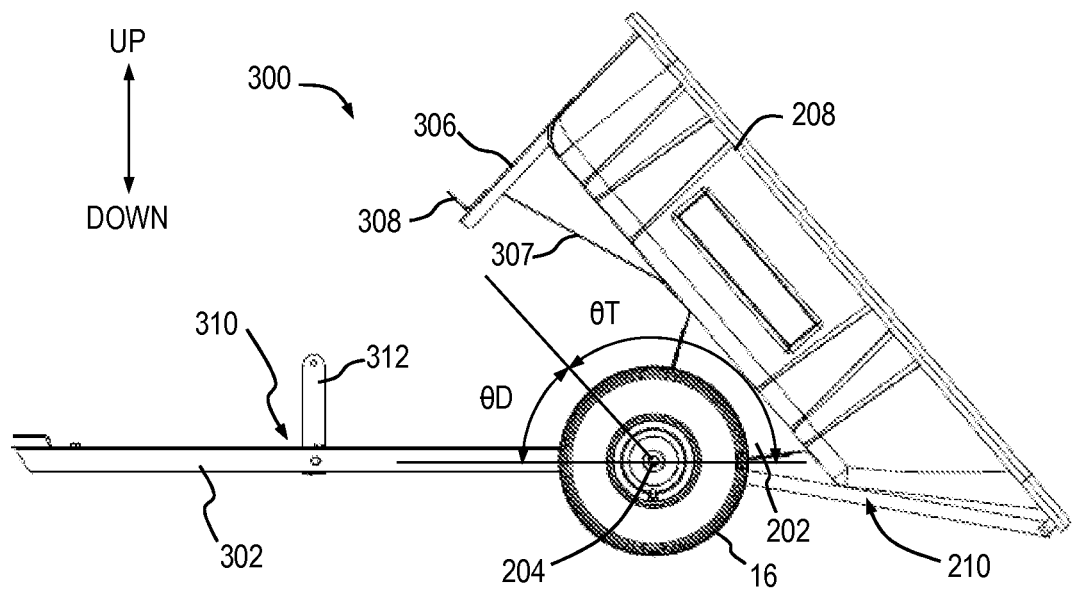
FIG. 24 is a side view of the cart of FIG. 21 with a container of the cart in an unloading condition pivoted to a first dump angle θD.
Figure 25:
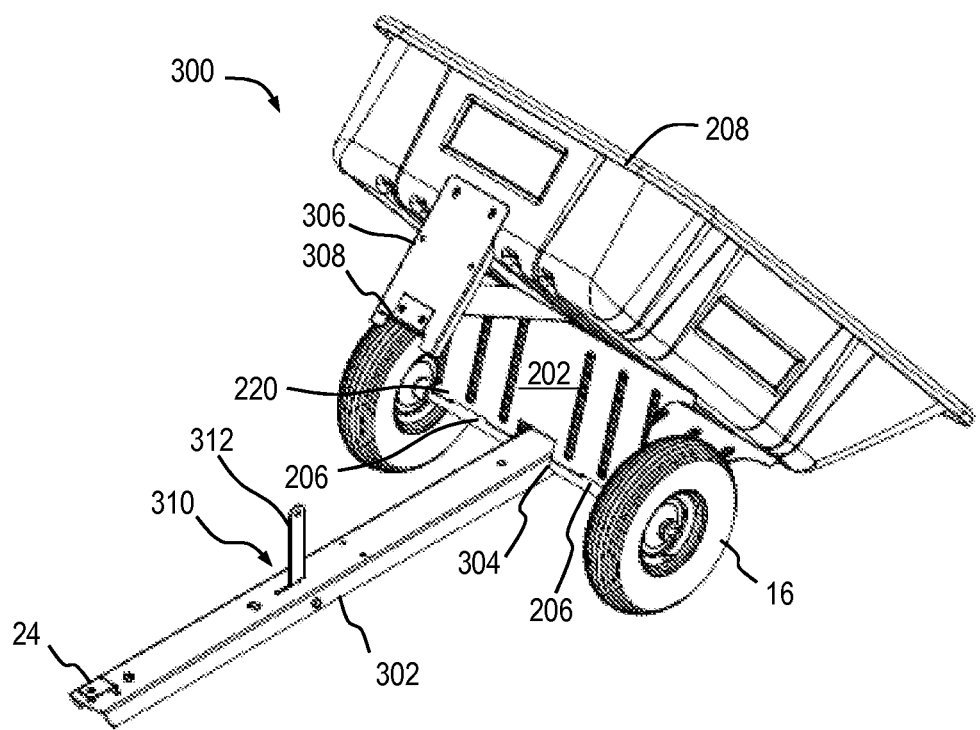
FIG. 25 is a perspective view of the cart of FIG. 24.
Figure 26:
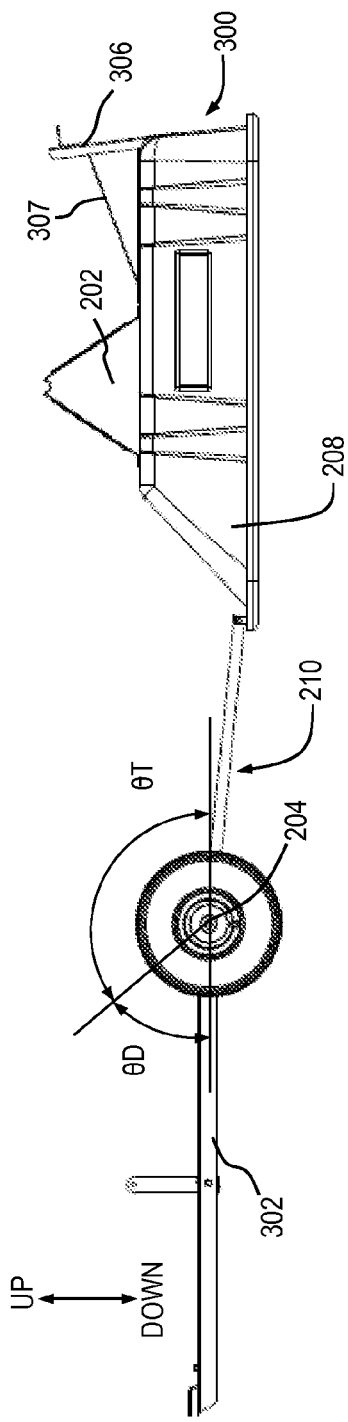
FIG. 26 is a side view of the cart of FIG. 21 with a container of the cart in an unloading condition pivoted to a second dump angle θT.
Figure 27:
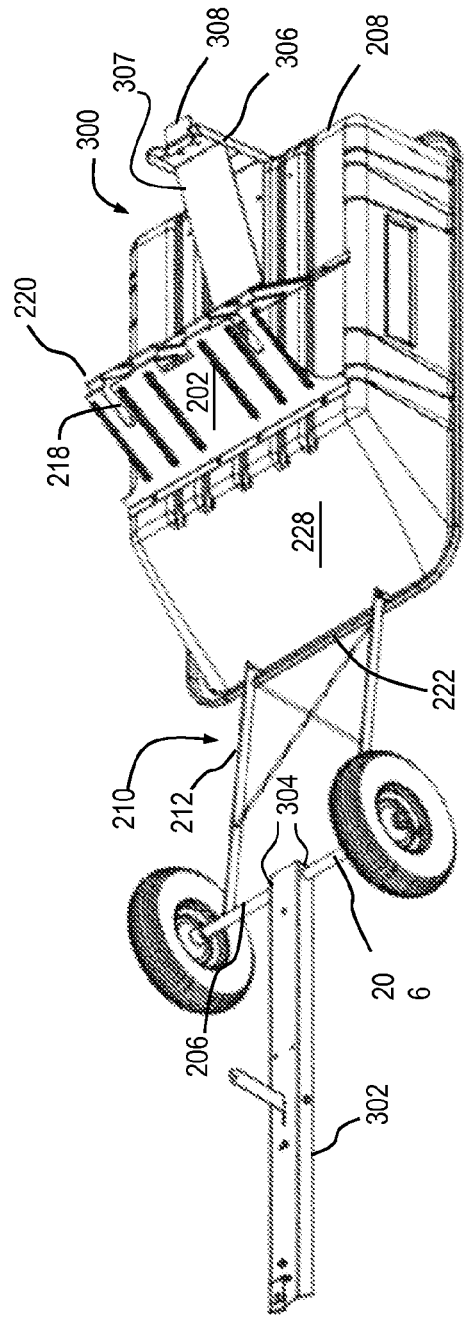
FIG. 27 is a perspective view of the cart of FIG. 26.
Figure 28:
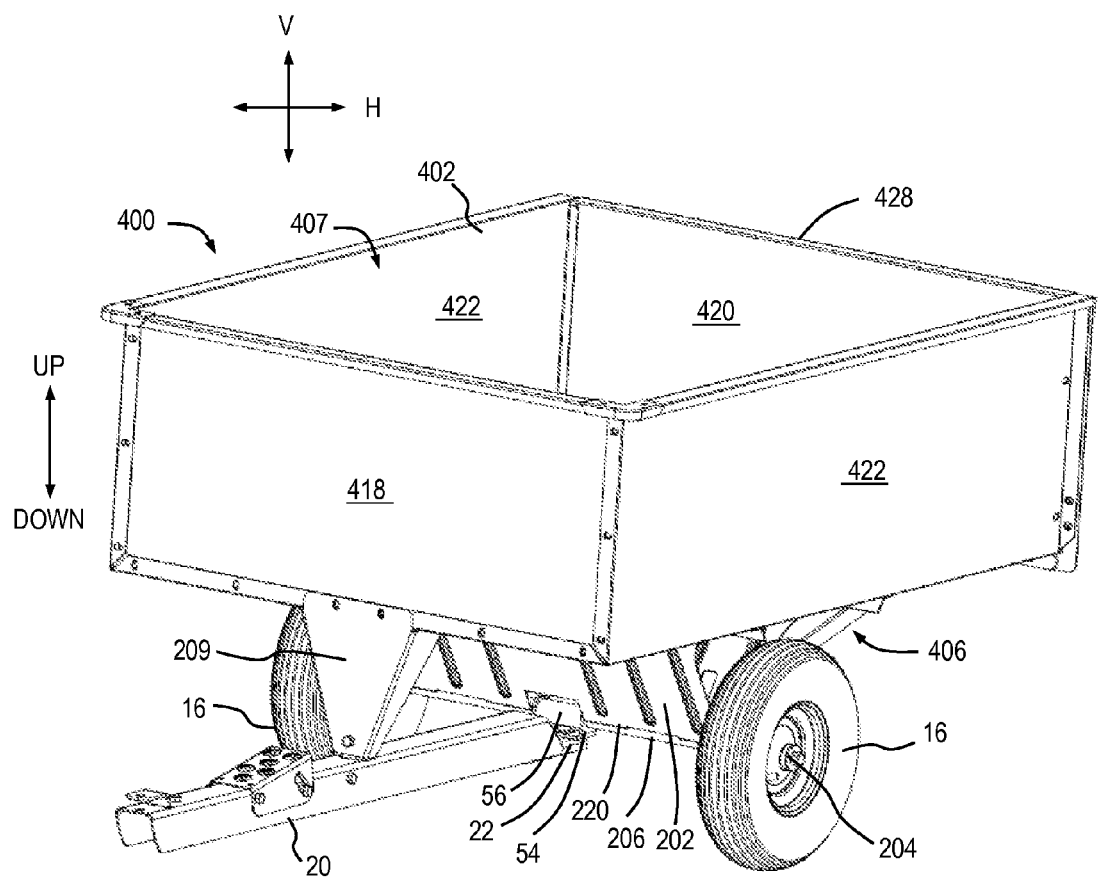
FIG. 28 is a perspective view showing the general arrangement of a lawn and garden cart according to another embodiment of the present invention, showing the tow bar assembled to the cart.

With reference to FIGS. 16 and 17, in an unloading condition similar to that for cart 10, the arm 209 may be released from the tow bar 20 by operating latch 26. In this condition container 208 is free to pivot or rotate about axle 204. As arm 209 moves away from tow bar 20, the frame 202 (and thus container 208) pivots about the axle 204 to a first dumping angle θD formed with respect to the tow bar and container opening 211 or bottom 230. Seat portions 220 of the frame 202 remain attached or coupled to the bearings 206 when the container 208 pivots through the first dump angle θD. In one embodiment, container 208 may rotate relative to the axle 204 through a first dump angle θD of about 55 degrees. In some embodiments, similar to cart 10, the tow bar 20 is further configured to pivot laterally with respect to the axle 204 (similar to FIG. 8), increasing the maneuverability of the cart 200. The tow bar 20 is thus movable on a first and a second axis with respect to the axle 204.

The container 208 is preferably movable and pivotable by the tip structure 210 between the loading and unloading condition over a pivoting range greater than ninety degrees. For example, for full unloading of container 208, the frame 202 may then be further lifted and removed from the bearings 206 of the axle 204 and the container 208 further pivoted about the tip structure 210 from first dump angle θD to a second dump angle θT, as shown in FIGS. 18 and 19. In one embodiment, second dump angle θT may range about 125 degrees about the axle 204 and is formed with respect to tow bar 20 and container bottom 230. The frame 202 is detached or uncoupled from the bearings 206 when the container 208 is pivoted through the second dump angle θT. In one embodiment the sum of the first and second dump angles, θD and θT respectively, is about 180 degrees. The container 208 is thus configured to rotate about 180 degrees between the loaded and fully unloaded conditions such that the opening 211 of the container moves between a substantially upward position (FIG. 14B) to a substantially downward position (FIG. 18). Alternatively, the sum of the angles θD and θT may be from about 140 degrees to about 220 degrees, or from any range from about 55 degrees to about 220 degrees.

The angle of rotation for θD and/or θT may be varied as desired, for example to accommodate the elevation of an underlying load receiving surface that the rear lip 226 and/or rear wall 228 of the container 208 are to engage. In situations where the underlying load receiving surface is at or below the elevation level of the bottom of the wheels 16, the container 208 may be pivoted to an angle that provides a 180 degrees full dump such that the rear lip 226 elevation is below the elevation of the bottom of wheels 16. In addition, in situations where the underlying load receiving surface is above the elevation level of the bottom of the wheels 16, the container 208 may be pivoted to an angle that provides a 180 degrees full dump such that the rear lip 226 elevation is above the elevation of the bottom of wheels 16.

The general arrangement of a cart 300 is depicted in FIGS. 21 through 27 according to yet another embodiment of the present invention. Cart 300 includes a frame 202 and an axle 204 to which a pair of wheels 16 are rotatably attached. The axle 204 may include at least one bearing 206 that is rotatably coupled to the axle. In this embodiment a first end of the frame 202 is configured for selectable attachment to the bearings 206. A container 208 is attached to a second, opposing end of the frame 202. A tow bar 302 is pivotably coupled to axle 204 by a pair of spaced-apart apertures 304 at a first end, the apertures 304 allowing the tow bar to pivot with respect to the axle. A hitch 24 at an opposing second end of tow bar 302 facilitates coupling of cart 300 to a lawn tractor (not shown) or other towing device. An arm 306 has first and second opposing ends, the first end of the arm being attached to the container 208, and the second end being received by and selectably secured or coupled to the tow bar 302. The arm 306 may include a brace 307 extending from the arm and attaching to the container 208. The second end of arm 306 may include a receptor portion 308 extending therefrom, and the receptor portion is configured for selectably coupling the arm to the tow bar 302.

Cart 300 also includes a latch 310 configured to selectably secure the second end of the arm 306 to the tow bar 302. The latch 310 includes a movable lever 312 that is pivotably coupled to the tow bar 302 and includes a notch 314 that is configured to selectably engage the receptor portion 308. A biasing element 316 is also provided with the latch 310 to urge the notch 314 of movable lever 312 into engagement with the receptor portion 308. When the lever 312 is actuated by urging the upper portion toward the second end of the tow bar 302, the notch 314 rotates away from the receptor portion 308 to release the arm 306 from the tow bar 302. Once released, the lever 312 rotates back toward the first end of the tow bar 302. In one embodiment the lever 312 is configured for remote actuation by attachment to a cord, rope, chain or other suitable actuator. To reengage the arm 306, the lever 312 is moved toward the second end of the tow bar 302 and the receptor portion 308 is rotated down toward the tow bar until generally adjacent to the lever 312. Lever 312 is released once the receptor portion 308 has been engaged by the notch 314 of the lever. Cart 300 is otherwise similar to cart 200 and thus will not be detailed further here.

The general arrangement of a cart 400 is depicted in FIGS. 28 through 36 according to still another embodiment of the present invention. Cart 400 includes a frame 202 and an axle 204 to which a pair of wheels 16 are rotatably attached. The axle 204 may include at least one bearing 206 that is rotatably coupled to the axle. In this embodiment a first end of the frame 202 is configured for selectable attachment to a pair of bearings 206. A container 402 is attached to a second, opposing end of the frame 202. Container 402 may include reinforcing seams or ridges 404 that extend through openings 203 in the frame 202. A tow bar 20 is pivotably coupled to axle 204 by a connector 22 at a first end, the connector allowing the tow bar to both pivot and move laterally with respect to the axle. A support spacer 56 may optionally be assembled with a bracket 54 on axle 204, similar to cart 10, as described above. An arm 209 has first and second opposing ends, the first end of the arm being attached to the container 402 and the second end being selectably secured or coupled to the tow bar 20. Details of tow bar 20 and arm 209 and the associated components are provided above and are illustrated in the previous drawings.

The cart 400 includes a tip structure 406 having first and second ends. The first end of the tip structure 406 is pivotally coupled to the container 402 and the second end of the tip structure is fixedly attached to the bearings 206. The container 402 is preferably movable and pivotable by the tip structure 406 between the loading and unloading condition over a pivoting range greater than ninety degrees. The tip structure 406 allows the container 402 to rotate or pivot over a wide range about the axle 204 and the first end of the tip structure 406 to substantially fully dump the load (i.e., empty the contents of container 402). In some embodiments cart 400 is configured to allow container 402 to pivot over a range of about 180 degrees relative to an opening 407 (or bottom 416) of the container, as discussed further below.

The tip structure 406 includes a pair of spaced-apart and generally parallel side bars 408. A first end of the side bars 408 is pivotally coupled to a tipping member 410 and a second, opposing end of the side bars is fixedly attached to the bearings 206. The first end of the tipping member 410 is pivotally coupled to the container 402 and the second end of the tipping member is pivotally coupled to the first end of the side bars 408. In an alternative embodiment, in addition to the first end of the side bars 408 being rotatable, the second end of the side bars may be configured for direct rotational connection to the axle 204 (not shown). The tip structure 406 may optionally include one or more cross braces 412 that extend between the side bars 408, and are configured to attach to the side bars to provide structural reinforcement. Additionally or alternatively, the tip structure 406 may include cross braces 412 that attach to the tipping member 410 (not shown). The attachment of the side bars 408 to the bearings 206 and of the cross braces 412 to the side bars or to the tip structure 406 may be by any suitable attachment such as, but not limited to, by welding, clamps, or fasteners.

Figure 30:
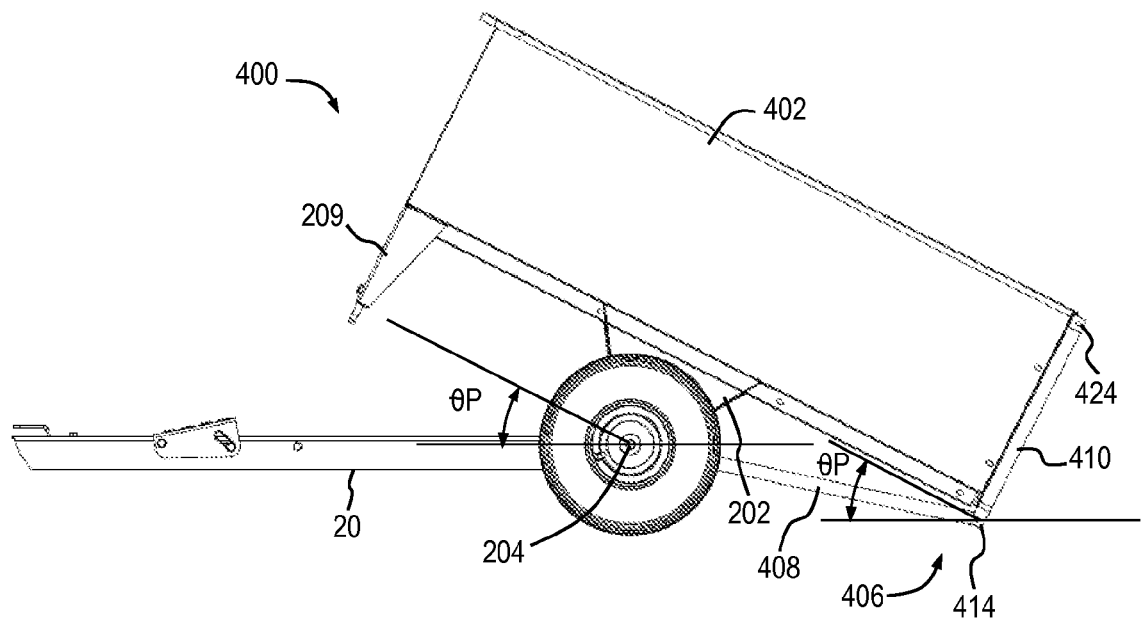
FIG. 30 is a side view of the cart of FIG. 28 with a container of the cart in a preparation for unloading position pivoted to a first dump angle θP.

In one embodiment the tipping member 410 may be a generally U-shaped frame, and may include at the second end a pair of spaced-apart tabs 414, (FIG. 36B) that are integral to the tipping member and pivotably coupled to the first ends of the side bars 408. Alternatively, the attachment of the tabs 414 to the tipping member 410 may be by any suitable attachment, such as by welding, clamps, or fasteners. The pivotable attachment of the first ends of side bars 408 to the tabs 414 may be by any suitable attachment, such as by pins 415 that allow the side bars to rotate. In one embodiment, the side bars 408 (and container 402) may be configured to rotate with the bearings 206 over a range of about 30 degrees about axle 204, from the loading to a first preparation for unloading position (FIG. 30).

Container 402 is a multi-walled receptacle configured to receive a load, similar to container 18. Similar to container 18 (see FIG. 1), container 402 may include a bottom 416, a front wall 418, an opposing rear wall 420 and a pair of opposing, spaced-apart sidewalls 422. A portion of container 402 is accessible through the opening 407 to allow removal of the load. In some embodiments the opening 407 is generally parallel to the bottom 416 of the container 402. Front wall 418, rear wall 420 and sidewalls 422 may be oriented generally at right angles to bottom 416, as shown in FIGS. 28 and 29A through 29D. Alternatively, one or more of front wall 418, rear wall 420 and sidewalls 422 may be oriented at an acute or obtuse angle with respect to bottom 416.

Container 402 includes a pair of spaced-apart tabs 424 (FIGS. 29A-29D, 35 and 36B) that are pivotably coupled to the first ends of the tipping member 410. Tabs 424 are each attached to opposing rear flanges 426, and located proximate to opposing ends of a rear lip 428 of the rear wall 420. Each flange 426 is located adjacent the opposing side walls 422 proximate to the rear wall 420. Alternatively, the tabs 424 may be configured as a bracket (not shown) that attaches directly to container 402. The attachment of the tabs 424 to the container 402 may be by any suitable attachment, such as by welding, clamps, or fasteners. Alternatively, the tabs 424 may be made integral to container 402. The pivotable attachment of the first ends of the tipping member 410 to the tabs 424 may be by any suitable attachment, such as by pins 425 that allow the tipping member to rotate.

As best seen in FIGS. 35 and 36B, the first end of the tipping member 410 may include spaced-apart opposing arms 430 that are configured for pivotal coupling to the tabs 424. The second end of the tipping member 410 may include a base 432 configured for pivotal coupling by tabs 414 to the first end of the side bars 408. The tipping member 410 is configured to be in a stowed condition facially adjacent to the container 402 when the cart 400 is in the loading and travel position (FIGS. 28 and 29A through 29D). In the travel position, arms 430 are located generally parallel and proximate to the rear flanges 426, and base 432 is generally parallel and proximate to the bottom 416 of container 402. In some embodiments, the rear wall 420 of container 402 includes a rear gate (not shown) configured for opening or removal to allow access to the contents loaded inside the container. The optional rear gate may be configured to slide out or pivot open from the rear wall 420. In one embodiment the container 402 is configured such that the rear wall 420 is removable from the container for access to the load. In the stowed condition, the tipping member 410 is configured to permit access to and operation of the optional rear gate or a rear opening created after removal of the rear wall 420.

The side bars 408, cross braces 412, and tipping member 410 may be made of any solid, hollow or other structural cross-section and construction suitable to support the loads applied to the cart 400. In another alternative embodiment, tipping member 410 may be pivotably connected by one or more hinges to the container 402 and/or to the side bars 408 (not shown). Cart 400 is otherwise structurally similar to cart 200 as detailed above, but configured for at least three unloading positions as detailed below.

Figure 31:
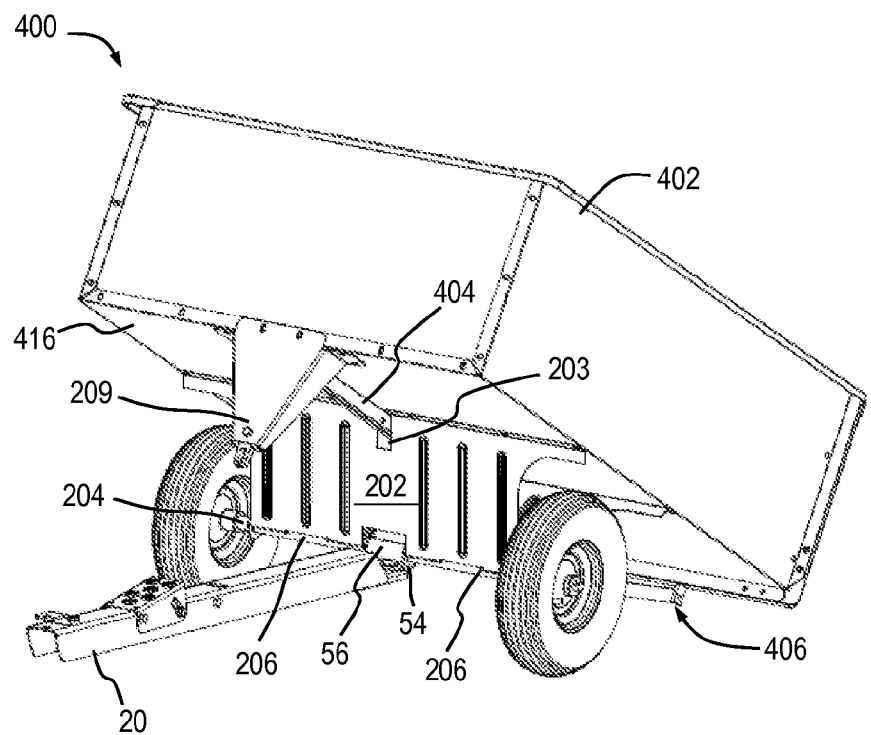
FIG. 31 is a perspective view of the cart of FIG. 30.

With reference to FIGS. 30 and 31, in a preparation for unloading position, the container 402 may be released from the tow bar 20 and moved away from the tow bar. The frame 202 may be pivoted about the axle 204 to a first dumping angle θP formed with respect to the tow bar 20 and container opening 407 or bottom 416. The frame 202 remains coupled to the bearings 206 when the container 402 pivots through the first dump angle θP. In one embodiment, container 402 may rotate relative to the axle 204 through a first dump angle θP of about 30 degrees. In the preparation for unloading position, the tipping member 410 remains in the stowed condition to allow access to and operation of the optional rear gate, for potential removal of part or all of the load. In some embodiments, similar to carts 10 and 200, the tow bar 20 is configured to pivot laterally with respect to the axle 204 (similar to FIG. 8), increasing the maneuverability of the cart 400. The tow bar 20 is thus movable on a first and a second axis with respect to the axle 204.

Figure 32:
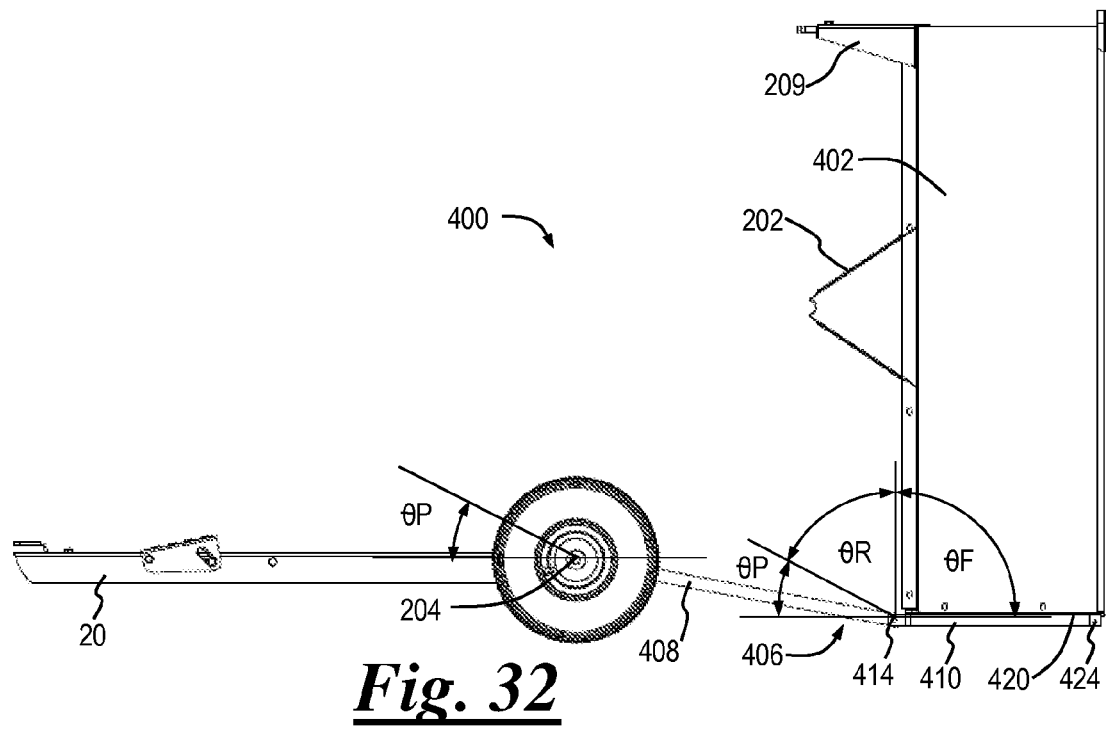
FIG. 32 is a side view of the cart of FIG. 28 with a container of the cart in a rear supported unloading position pivoted to a second dump angle θR.
Figure 33:
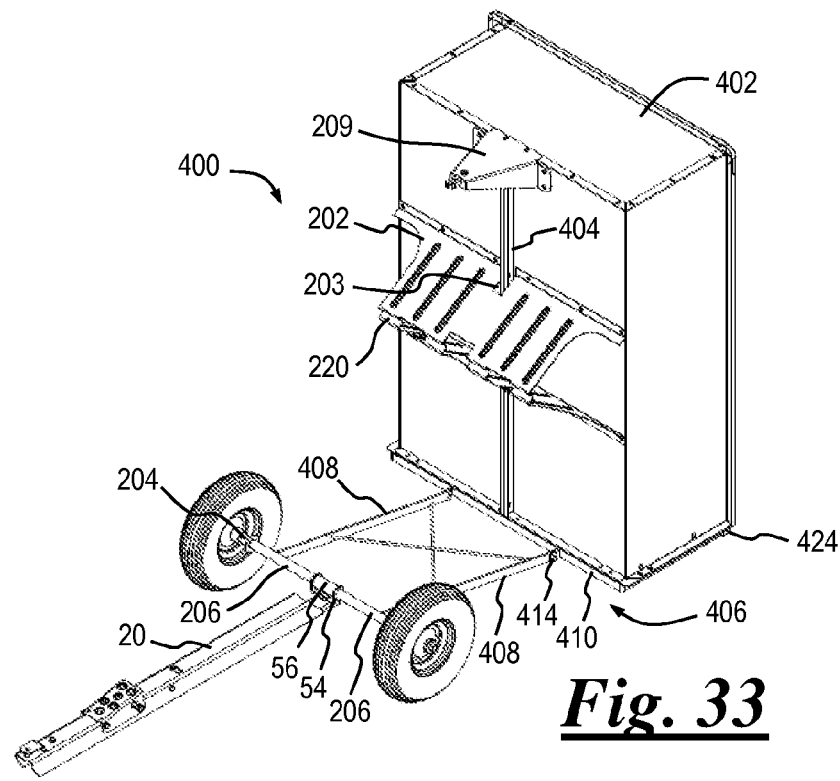
FIG. 33 is a perspective view of the cart of FIG. 32.
Figure 37A:
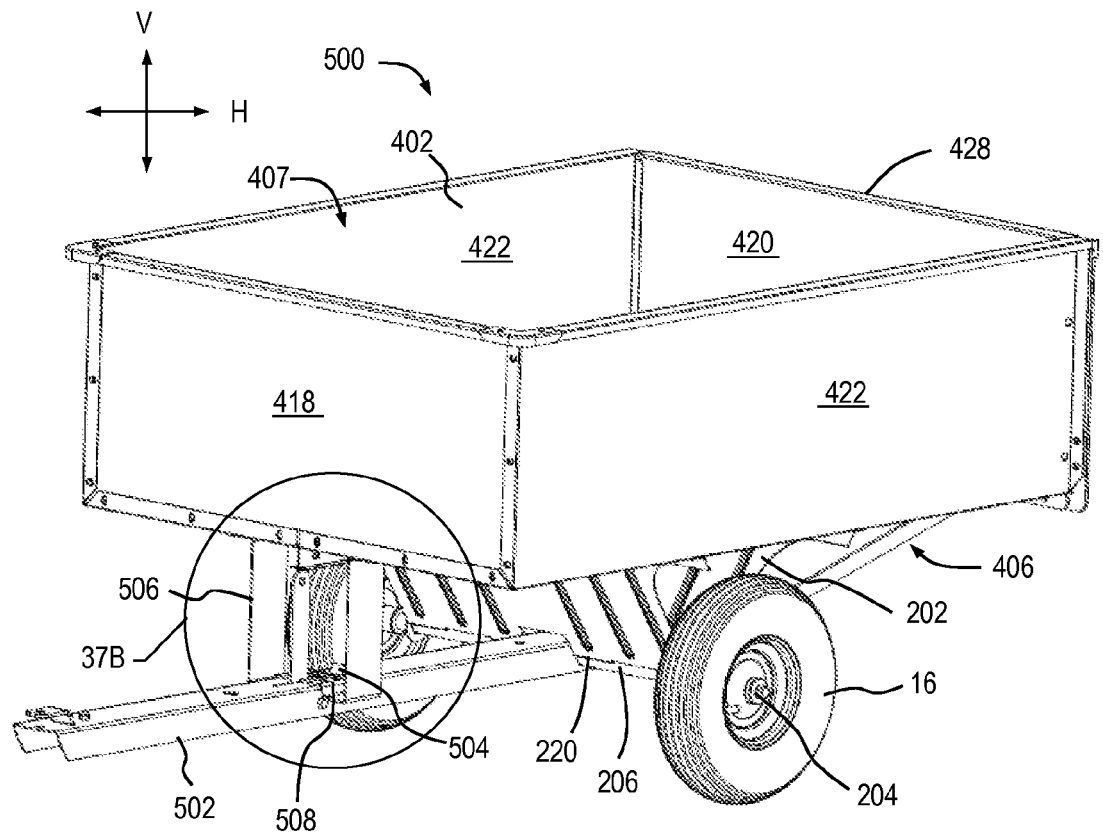
FIGS. 37A and 37B are a perspective view and a close-up view respectively showing the general arrangement of a lawn and garden cart according to another embodiment of the present invention, showing the tow bar assembled to the cart.
Figure 37B:
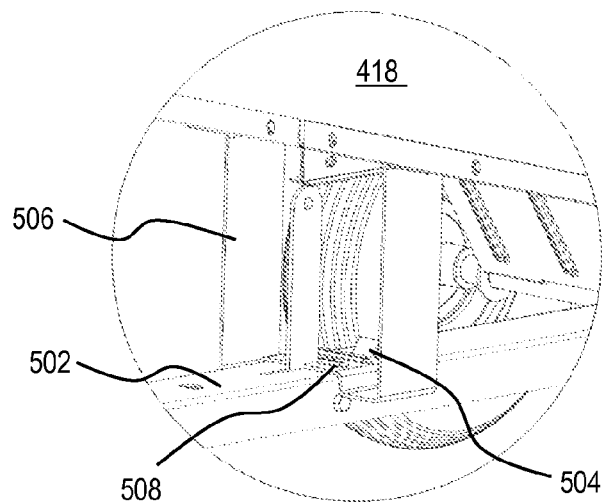
Figure 38A:
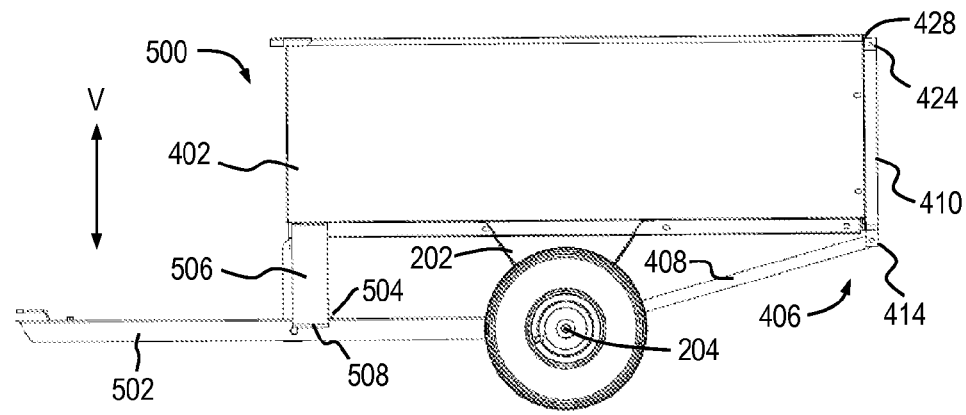
FIGS. 38A, 38B and 38C are side, rear and bottom views respectively of the cart of FIG. 37A.
Figure 38B:
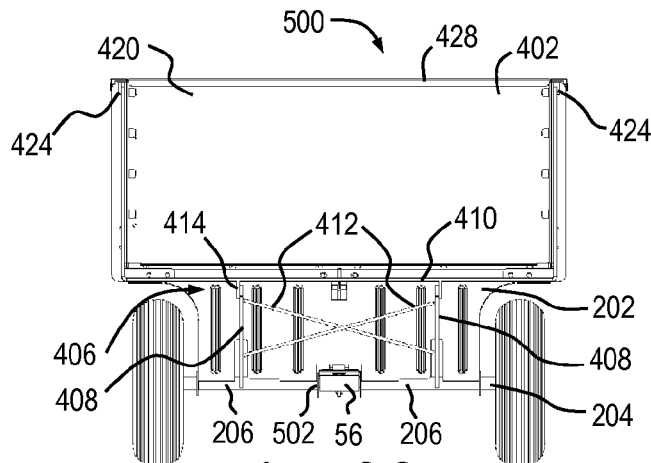
Figure 38C:
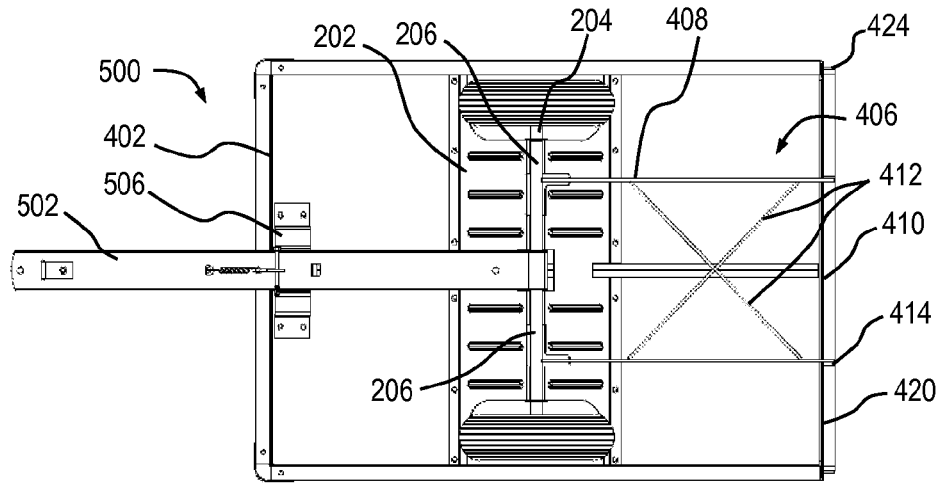
Figure 39:
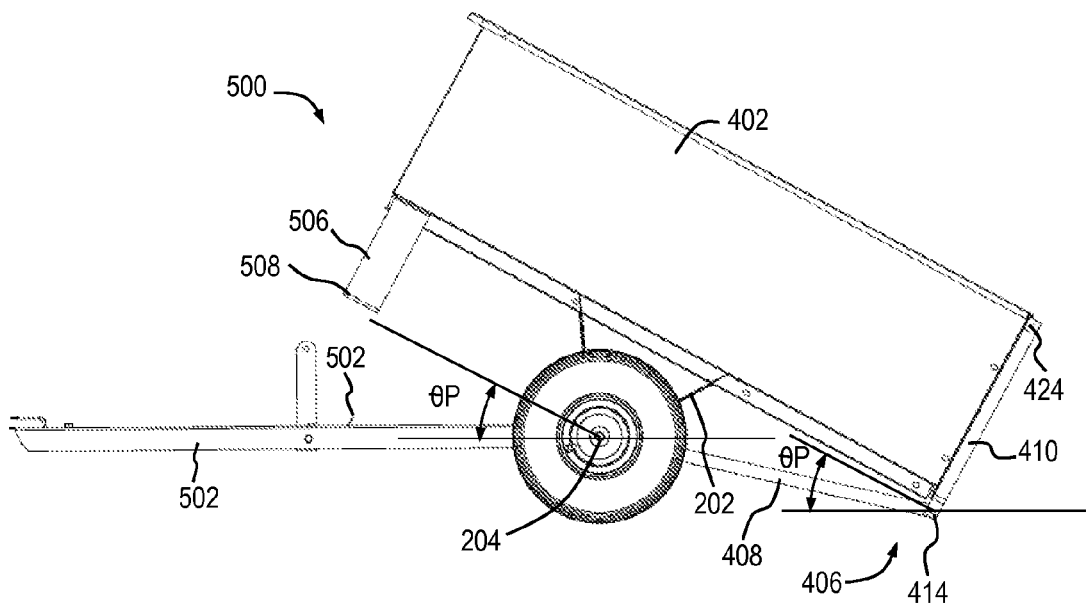
FIG. 39 is a side view of the cart of FIG. 37A with a container of the cart in a preparation for unloading condition pivoted to a first dump angle θP.
Figure 40:
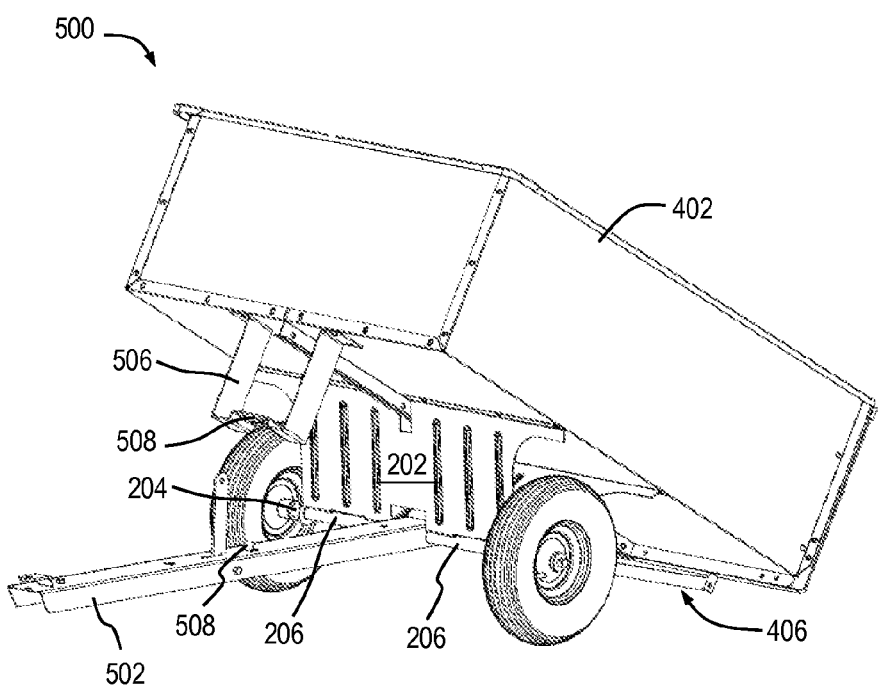
FIG. 40 is a perspective view of the cart of FIG. 39.
Figure 41:
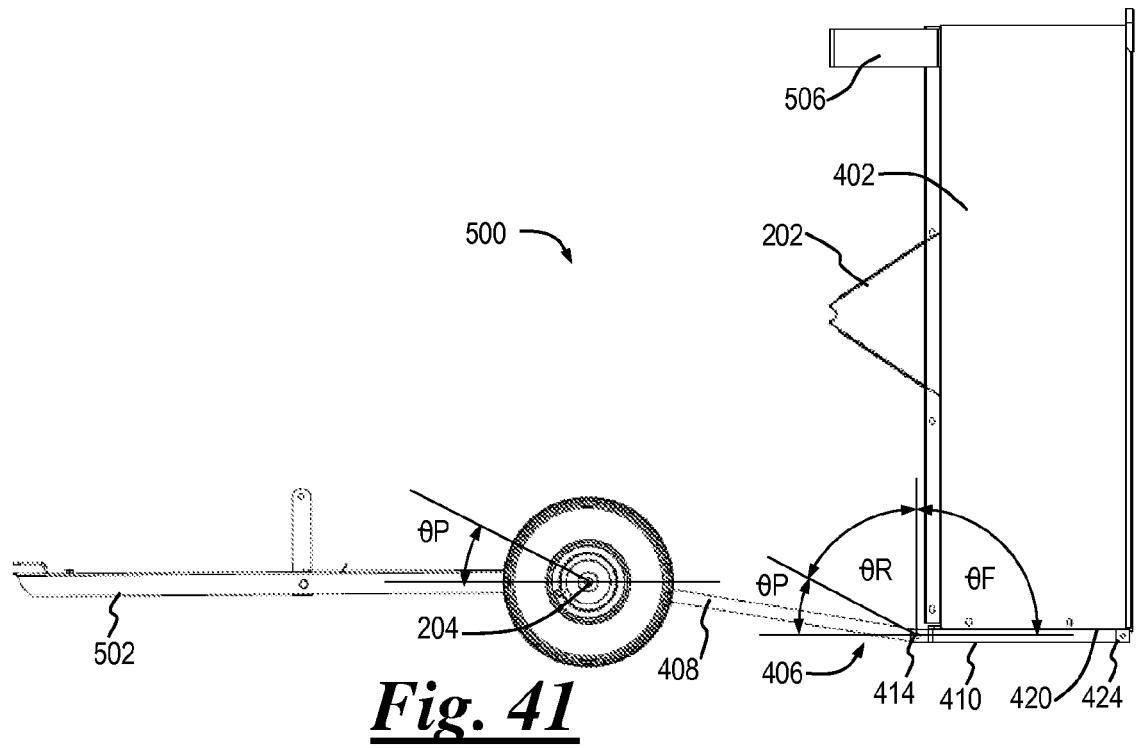
FIG. 41 is a side view of the cart of FIG. 37A with a container of the cart in an unloading condition pivoted to a second dump angle θR.
Figure 42:
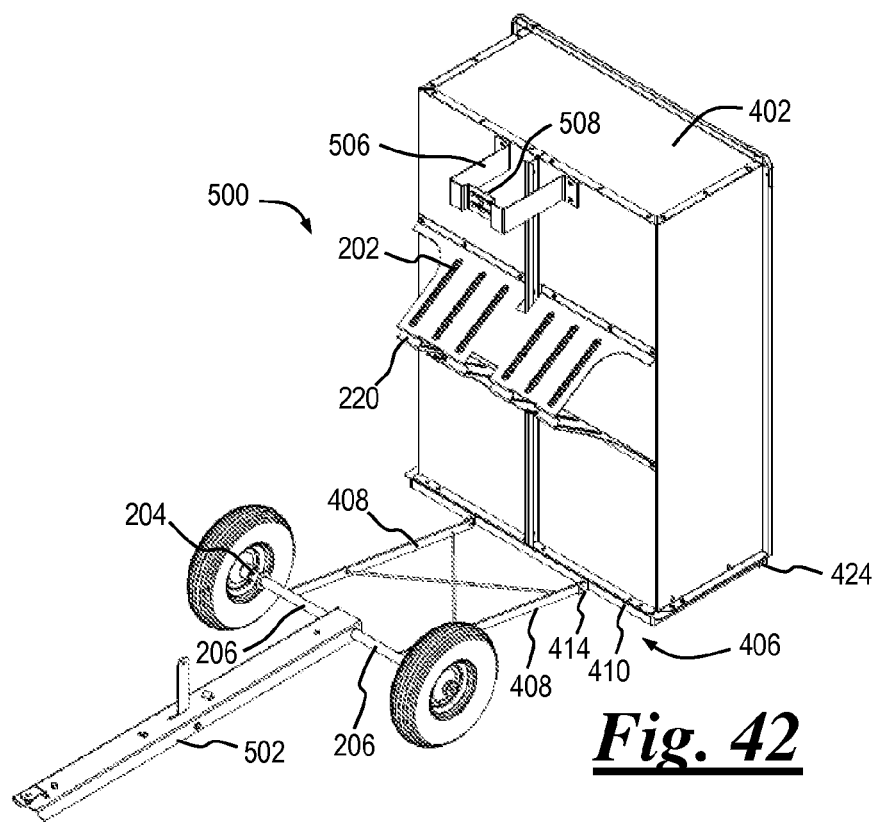
FIG. 42 is a perspective view of the cart of FIG. 41.

With reference to FIGS. 32 and 33, the frame 202 may then be further lifted and detached or uncoupled from the bearings 206 of the axle 204 and the container 402 further pivoted about the pins 415 of tipping member 410 from first dump angle θP to a second dump angle θR, into a rear supported unloading position. In the rear supported unloading position, the rear wall 420 of container 402 is generally proximate to an underlying load receiving surface, such as the ground or pavement. In one embodiment, container 402 may rotate about the pins 415 through a second dump angle θR of about 60 degrees, and θR is formed with respect to first dump angle θP and container bottom 416. The frame 202 is detached from the bearings 206 when the container 402 is pivoted through the second dump angle θR. In one embodiment the sum of the first and second dump angles, θP and θR respectively, is about 90 degrees. In the rear supported unloading position, the tipping member 410 remains in the stowed condition and generally proximate to the underlying load receiving surface.

The container 402 is preferably movable and pivotable by the tip structure 406 between the loading and unloading condition over a pivoting range greater than ninety degrees. As shown in FIGS. 34, 35, 36A and 36B, the container 402 may be further pivoted about the pins 425 proximate the rear lip 428 from the second dump angle θR to a third dump angle θF, into a full unloading position. In the full unloading position, the opening 407 of container 402 is generally proximate to an underlying load receiving surface, such as the ground or pavement. In one embodiment, third dump angle θF may range to about 90 degrees relative to the pins 425, and θF is formed with respect to second dump angle θR and container bottom 416. The frame 202 is detached from the bearings 206 when the container 402 is pivoted through the third dump angle θF, and the container 402 rotates away from the tipping member 410. In one embodiment the sum of the first, second and third dump angles, θP, θR and θF respectively, is about 180 degrees. The container 402 is thus configured to rotate about 180 degrees between the loaded and fully unloaded conditions. Alternatively, the sum of the angles may be from about 140 degrees to about 220 degrees, or from any range from about 90 degrees to about 220 degrees. The angle of rotation for θP, θR and/or θF may be varied as desired, for example to accommodate the elevation of an underlying load receiving surface that the rear lip 428 and/or rear wall 420 of the container 402 are to engage.

The general arrangement of a cart 500 is depicted in FIGS. 37 through 44 according to yet another embodiment of the present invention. Cart 500 includes a frame 202 and an axle 204 to which a pair of wheels 16 are rotatably attached. The axle 204 may include at least one bearing 206 that is rotatably coupled to the axle. In this embodiment a first end of the frame 202 is configured for selectable attachment to the bearings 206. A container 402 is attached to a second, opposing end of the frame 202. A tow bar 502 similar to tow bar 302 is pivotably coupled to axle 204, allowing the tow bar to pivot with respect to the axle. Tow bar 502 may include a guide 504 configured to align and guide an arm 506 for connection to the tow bar. Arm 506 has first and second opposing ends, and a generally U-shaped configuration. The first end of the arm 506 is attached to the container 402, and the second end is received by and selectably secured to the tow bar 502. The second end of arm 506 may include a receptor portion 508 configured for selectably securing the arm (and thus container 402) to the tow bar 502. The receptor portion 508 is secured to the tow bar 502 with a notched latch similar to tow bar 302 as described above and detailed in the previous drawings. Cart 500 is otherwise similar to cart 400 and thus will not be detailed further here.

In the various embodiments described above, it is understood that the non-pivoting features of tow bars 302 and 502 may be alternatively used in place of the pivoting connector 22 for tow bar 20. Further, it is understood that the container may be alternatively configured to be pivotably connected to the frame. It is also understood that the latch 26 and arm 209 may be alternatively used in place of the latch 310 and arm 306, and further that any suitable latch assembly may be used to secure the container in a travel position, and to release it into a pivoting position for dumping.

While this invention has been shown and described with respect to detailed embodiments thereof, it will be understood by those skilled in the art that changes in form and detail thereof may be made without departing from the scope of the claims of the invention.

What is claimed is:

1. A towable cart, comprising:
   an axle;
   at least one bearing rotatably coupled to the axle;
   a frame configured for selectable attachment to the bearing;
   a container attached to the frame;
   a tow bar having a first and a second end, the tow bar being coupled to the axle at the first end of the tow bar;
   a tip structure having a first and a second end, the first end of the tip structure being pivotally coupled to the container and the second end of the tip structure being fixedly attached to the bearing; and
   an arm attached to the container, the arm being selectably coupled to the tow bar,
   the container being in a loading condition when the arm is coupled to the tow bar,
   the container further being pivotable to an unloading condition when the arm is not coupled to the tow bar, and
   the container being movable between the loading condition and the unloading condition over a pivoting range greater than ninety degrees.

2. The towable cart of claim 1, further including a bracket intermediate the first end of the tow bar and the axle, the bracket being rotatably attached to the first end of the tow bar and pivotably coupled to the axle.

3. The towable cart of claim 1 wherein the tip structure further includes a plurality of spaced-apart side bars, a first end of the side bars being pivotally coupled to the container and a second end of the side bars being fixedly attached to the bearing.

4. The towable cart of claim 3 wherein the tip structure further includes at least one cross brace extending between the side bars.

5. The towable cart of claim 3 wherein the frame includes a plurality of slots, each slot being adapted to receive at least a portion of a corresponding side bar.

6. The towable cart of claim 3, further comprising:
   a rear lip extending from the container; and
   a tip bracket attached to the rear lip, the tip bracket being pivotably attached to the first ends of the side bars.

7. The towable cart of claim 6 wherein the tip bracket further includes a pair of spaced-apart tabs, the tabs being pivotably coupled to the first ends of the side bars.

8. The towable cart of claim 3 wherein the tip structure further includes a tipping member having a first and a second end, the first end of the tipping member being pivotally coupled to the container and the second end of the tipping member being pivotally coupled to the first ends of the side bars.

9. The towable cart of claim 8 wherein the container includes tabs configured for pivotal coupling to the tipping member.

10. The towable cart of claim 8 wherein the tipping member further includes at the second end a pair of spaced-apart tabs, the tabs being pivotably coupled to the first ends of the side bars.

11. The towable cart of claim 8 wherein the tipping member is configured to be in a stowed condition facially adjacent to the container when the cart is in the loading condition.

12. The towable cart of claim 8 wherein the tipping member is configured to be in a stowed condition facially adjacent to the container when the container is pivotable through at least one dump angle.

13. The towable cart of claim 1, further including the arm having a first and a second end, the first end of the arm being attached to the container and the second end of the arm being selectably coupled to the tow bar.

14. The towable cart of claim 1 wherein the container is pivotable from the loading condition through a plurality of dump angles to reach the unloading condition, the sum of the dump angles being about 180 degrees.

15. The towable cart of claim 14 wherein the frame is coupled to the bearing through at least one dump angle.

16. The towable cart of claim 14 wherein the frame is decoupled from the bearing through at least one dump angle.

17. The towable cart of claim 1 wherein the frame includes one or more seat portions configured for selectable coupling to the bearing.

18. The towable cart of claim 1 wherein the tow bar is movable on a first and a second axis with respect to the axle.

19. A towable cart, comprising:
   an axle;
   at least one bearing rotatably coupled to the axle;
   a frame configured for rotatable and selectable attachment to the bearing;
   a container attached to the frame;
   a tow bar having a first and a second end, the tow bar being coupled to the axle at the first end of the tow bar;
   a tip structure having a first and a second end, the first end of the tip structure being pivotally coupled to the container and the second end of the tip structure being fixedly attached to the bearing;
   an arm having:
      a first end;
      a second, opposing end; and
      a notch extending from the second end of the arm,
      the first end of the arm being attached to the container and the second end of the arm being received by and selectably coupled to the tow bar; and a latch, the latch being configured to selectably couple the arm to the tow bar, the notch extending into the tow bar when coupled thereto, the container being in a loading condition when the arm is coupled to the tow bar, the container further being pivotable to an unloading condition when the arm is not coupled to the tow bar, and the container being movable between the loading condition and the unloading condition over a pivoting range greater than ninety degrees.

\* \* \* \* \*